United States Patent [19]

Ikari et al.

[11] Patent Number: 4,568,150
[45] Date of Patent: Feb. 4, 1986

[54] ZOOM LENS SYSTEM

[75] Inventors: Kazuo Ikari; Tooru Fujii, both of Tokyo, Japan

[73] Assignee: Olympus Optical Co., Ltd., Tokyo, Japan

[21] Appl. No.: 594,317

[22] Filed: Mar. 28, 1984

[30] Foreign Application Priority Data

Apr. 9, 1983 [JP] Japan ................... 58-61566

[51] Int. Cl.$^4$ ............... G02B 9/64; G02B 15/22
[52] U.S. Cl. ................................. 350/427
[58] Field of Search .......................... 350/427

[56] References Cited

U.S. PATENT DOCUMENTS 4,223,981 9/1980 Mizutani et al.
4,468,098 8/1984 Itoh ......................... 350/427

FOREIGN PATENT DOCUMENTS 53-131852 11/1978 Japan .
56-126819 10/1981 Japan .

Primary Examiner—John K. Corbin
Assistant Examiner—Rebecca D. Gass
Attorney, Agent, or Firm—Cushman, Darby & Cushman

[57] ABSTRACT

A zoom lens system comprising a first, second, third and fourth lens groups, the first lens group being a focusing lens group and having positive refractive power, the second lens group being a variator and having negative refractive power, the third lens group being a compensator and having positive refractive power, the first, second and third lens groups constituting a varifocal subsystem, the fourth lens group being a relay lens, which comprises a first lens component comprising a positive lens and a negative lens and having positive refractive power as a whole, a second lens component comprising a positive lens, a third lens component comprising a negative lens, and a fourth lens component comprising a positive lens, the zoom lens system being small in size, light in weight and arranged that aberrations are corrected favourably.

9 Claims, 20 Drawing Figures

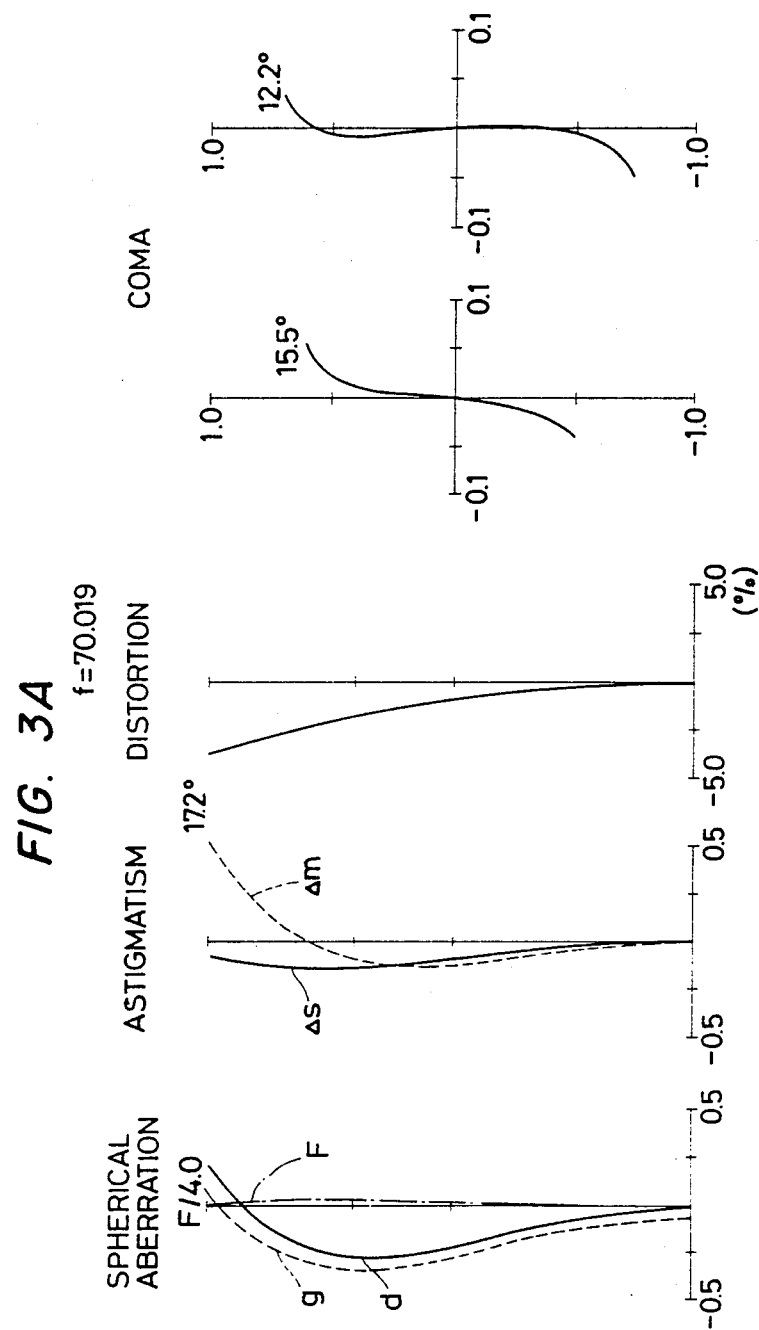

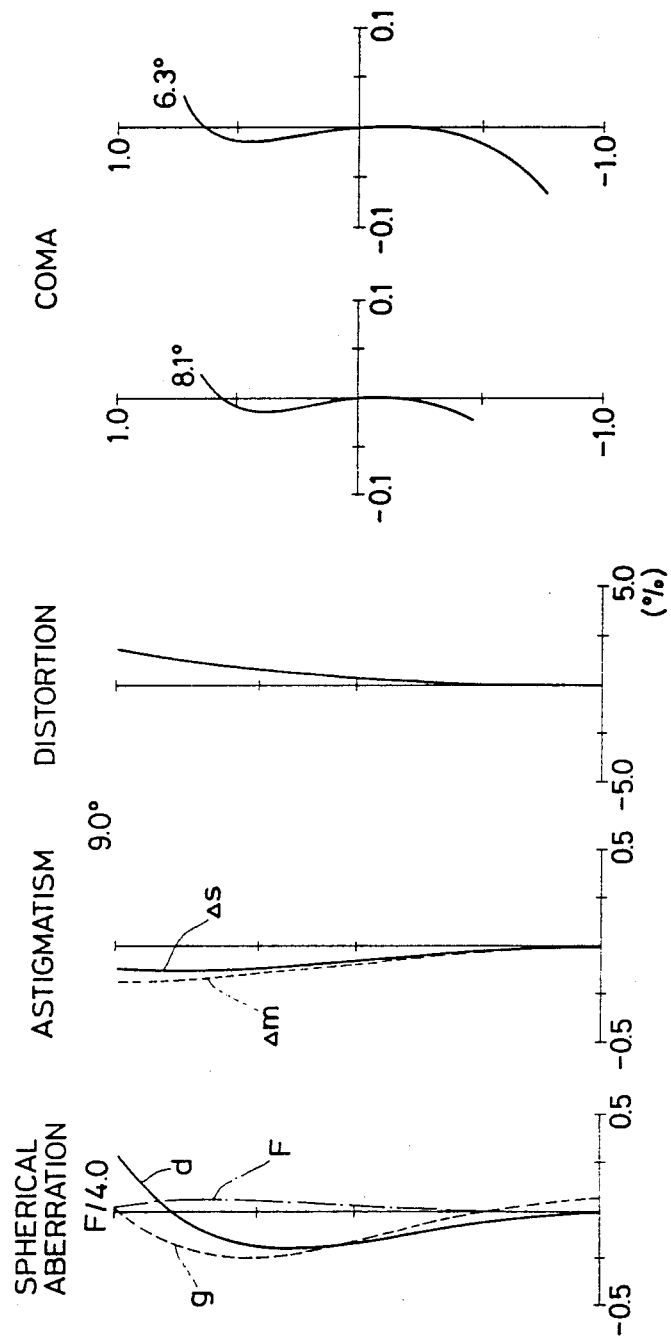

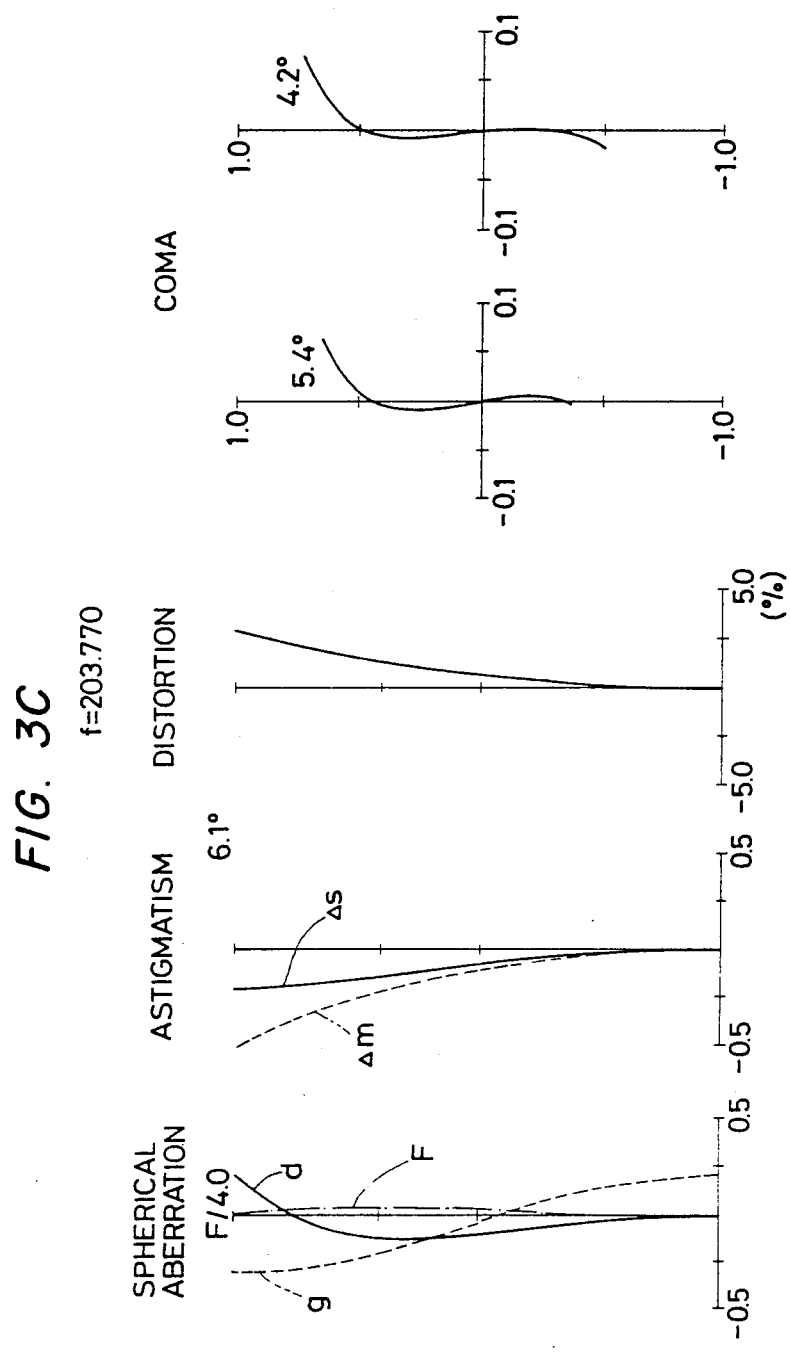
FIG. 3C  f=203.770

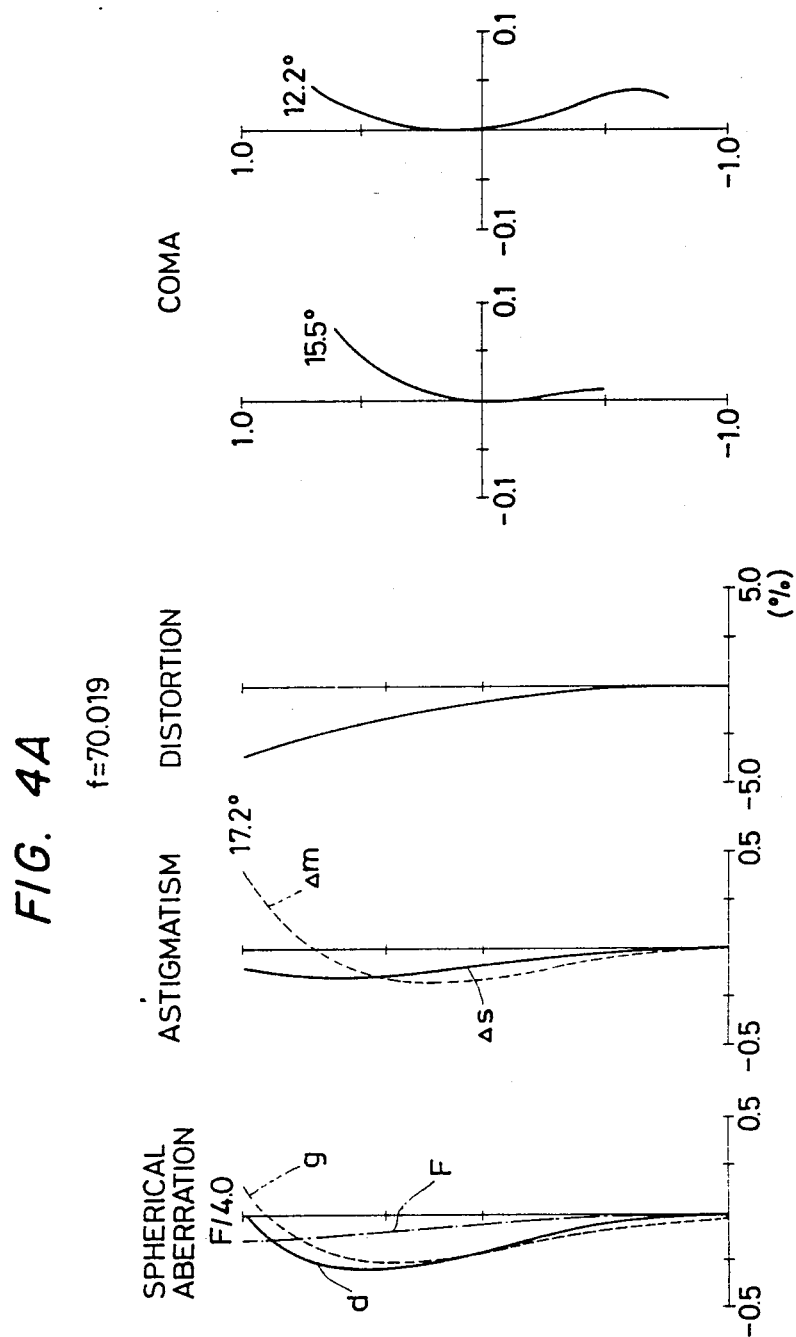

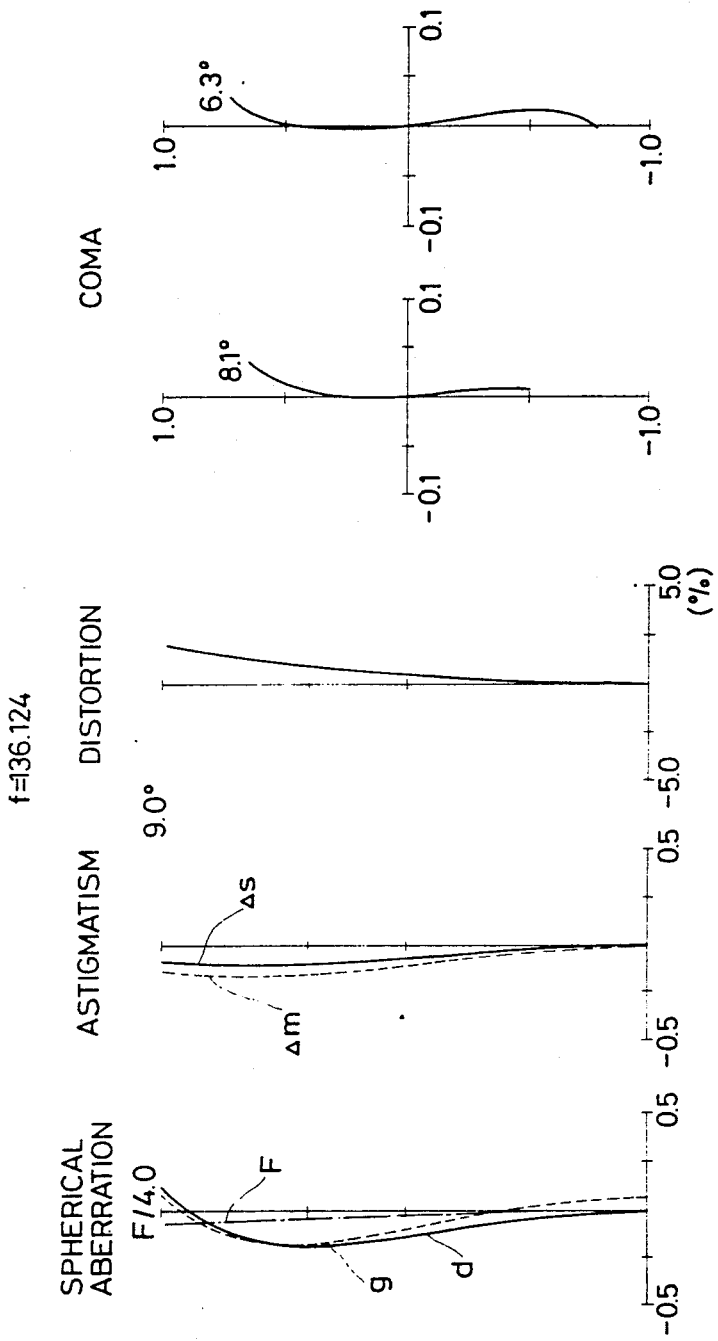

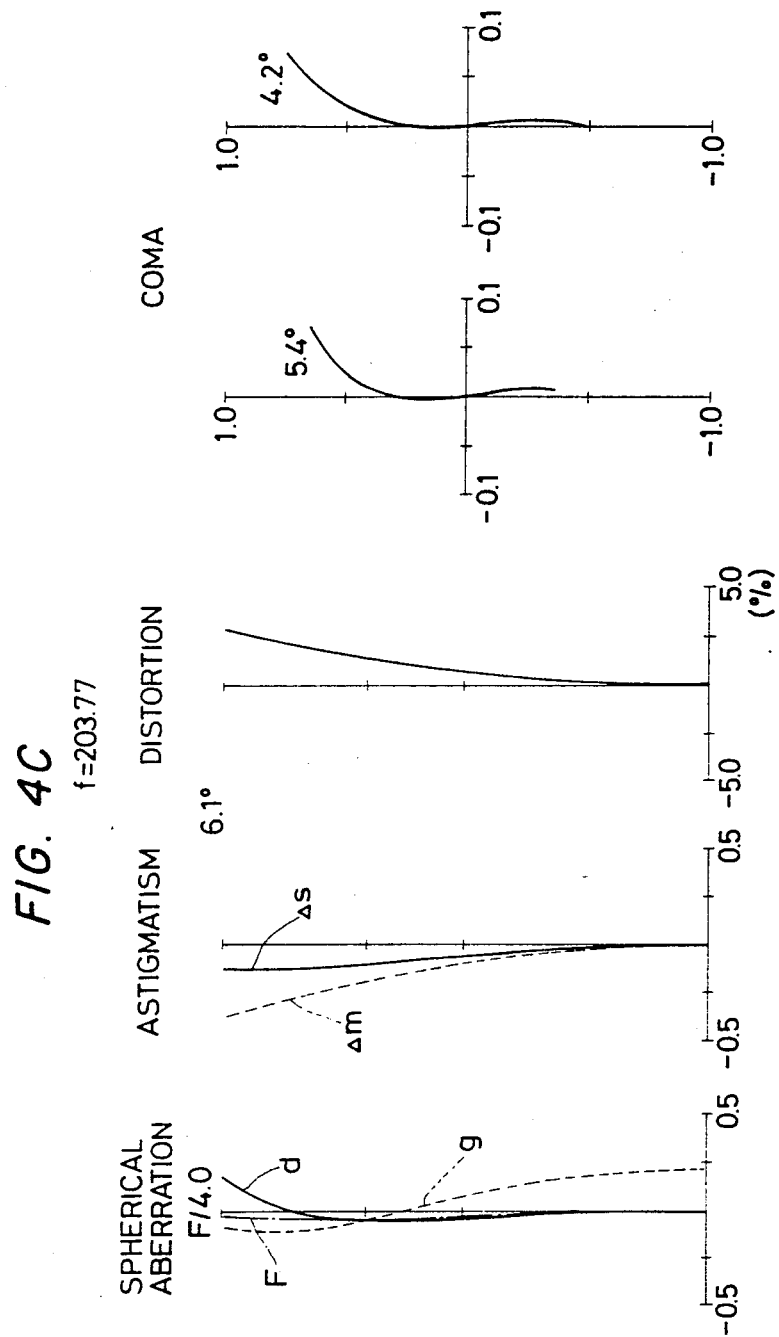

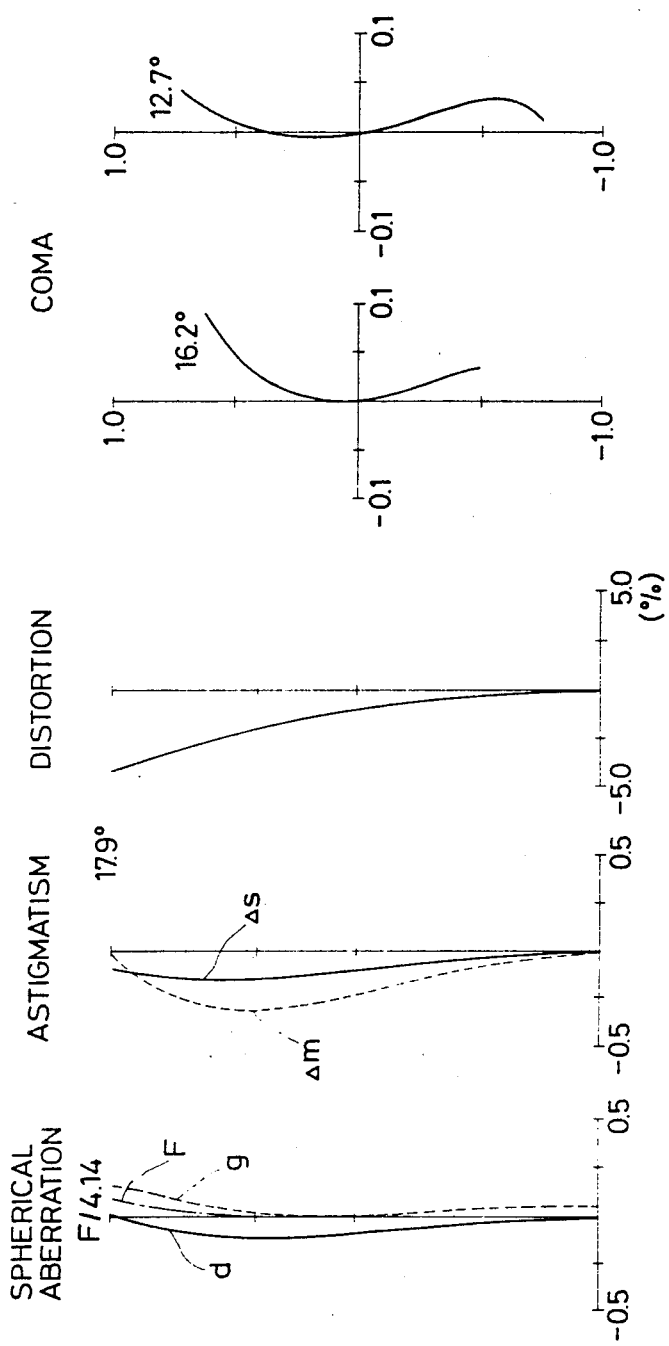

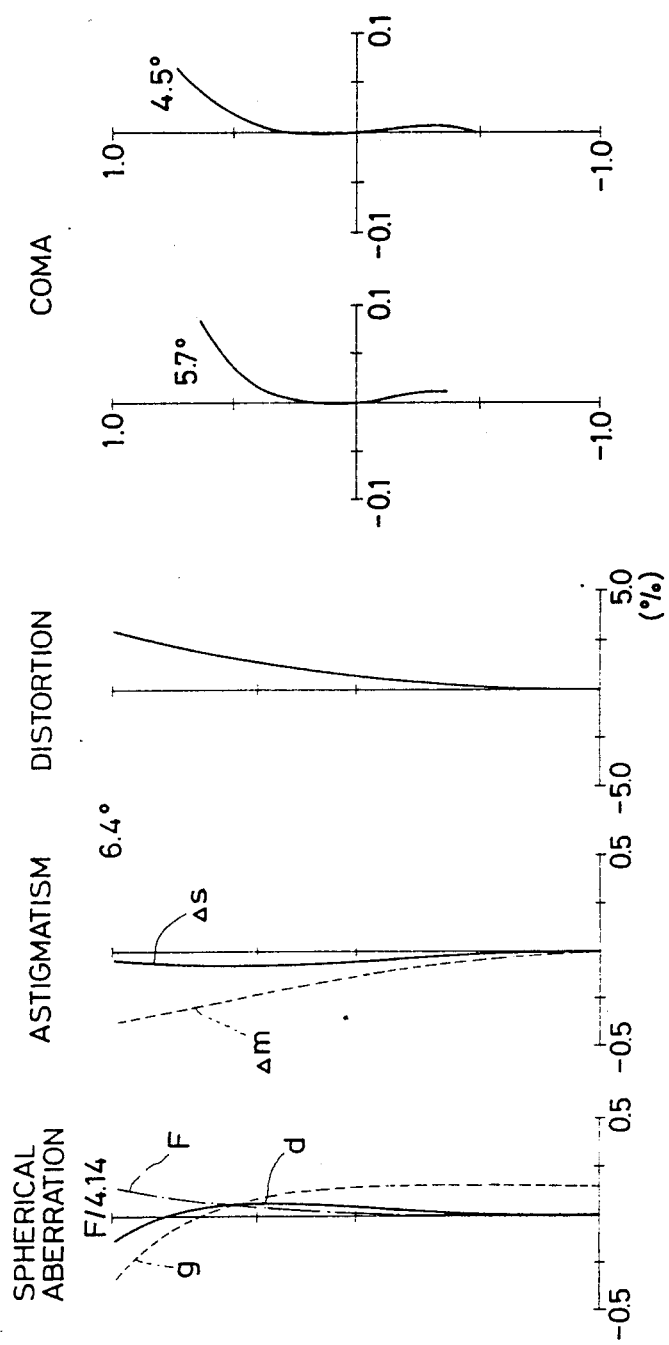

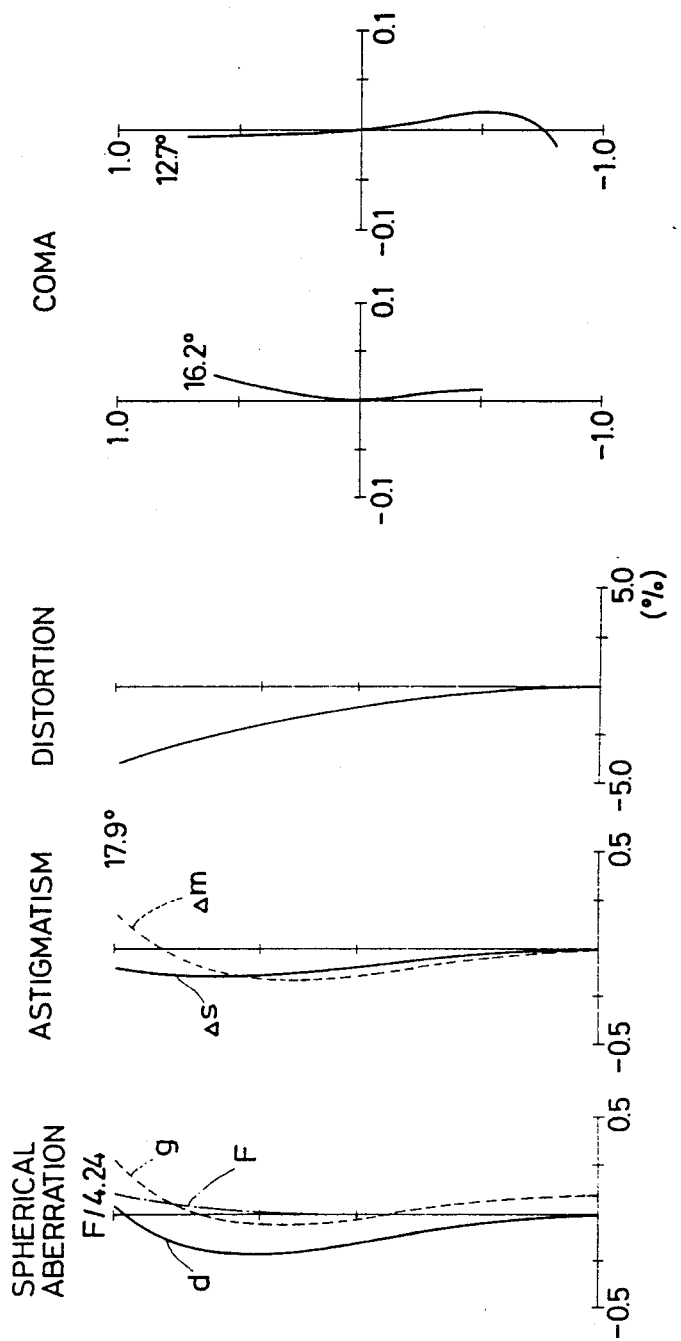

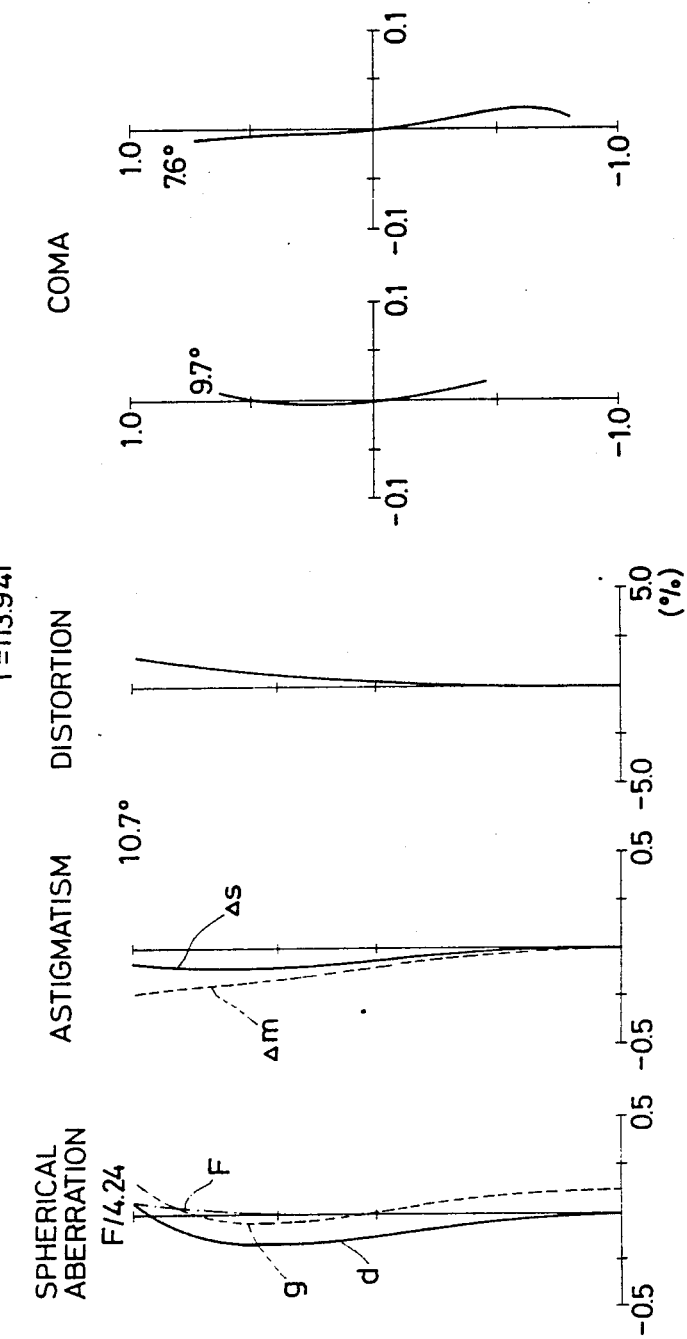

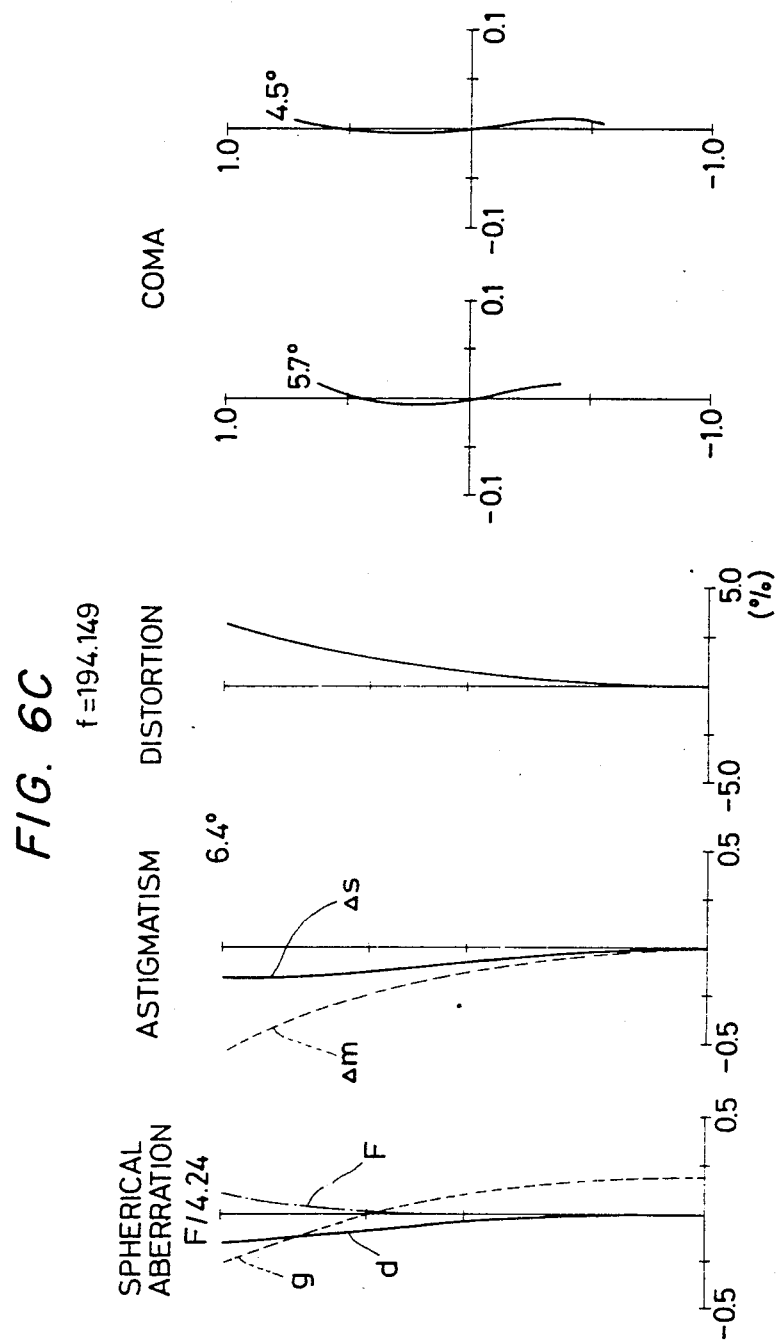

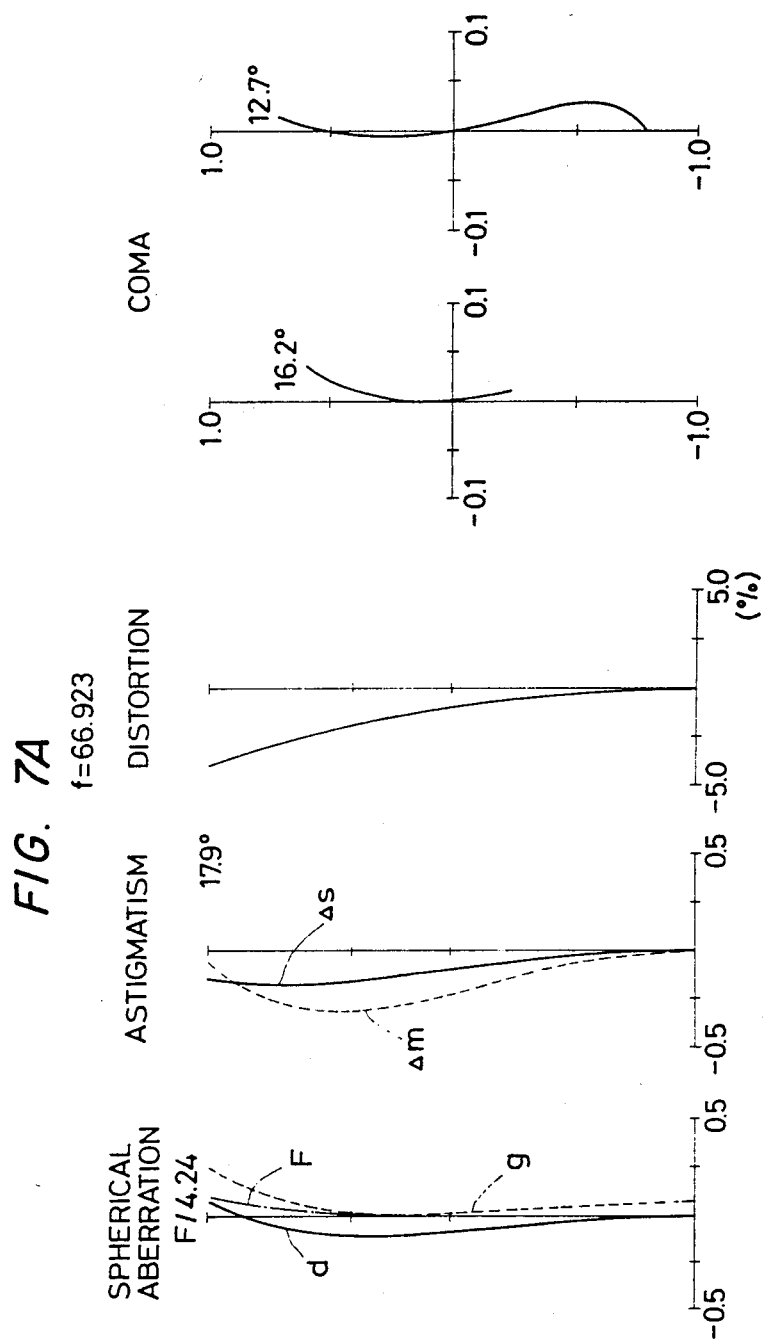

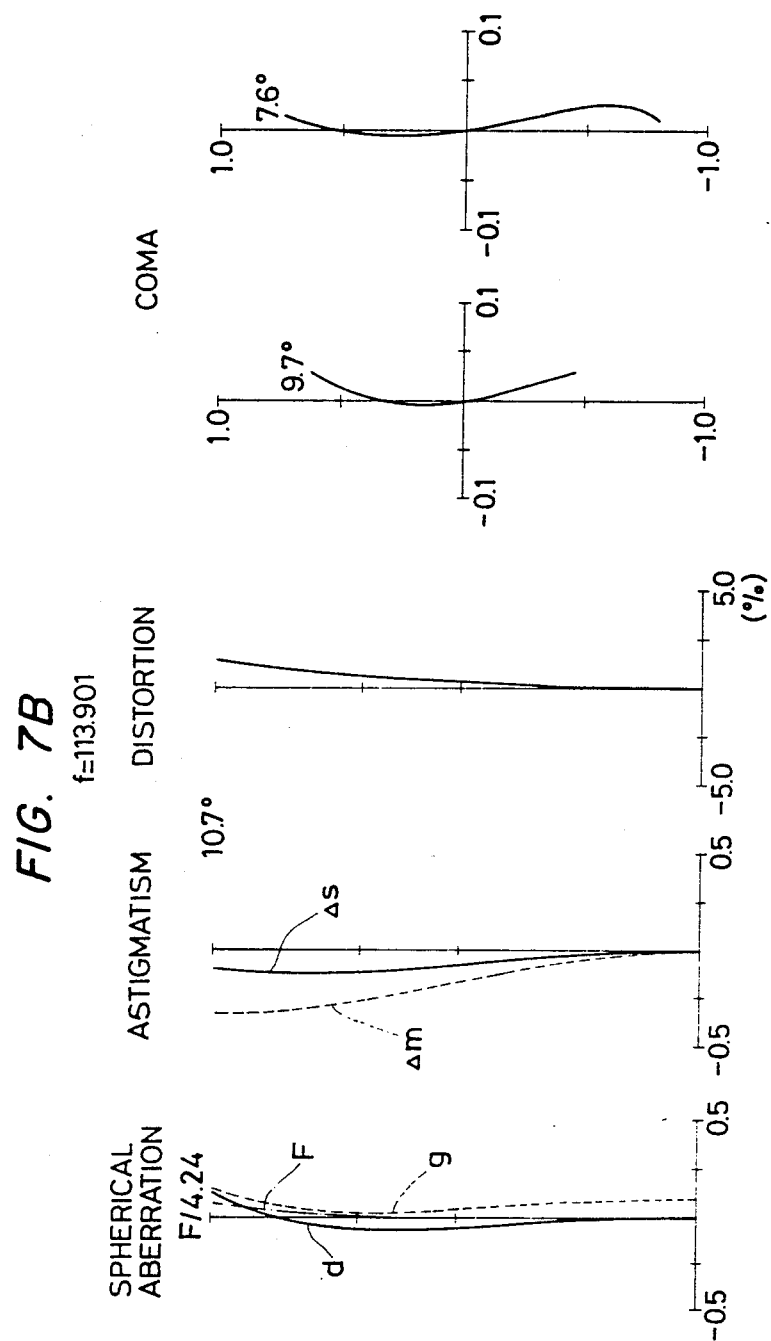

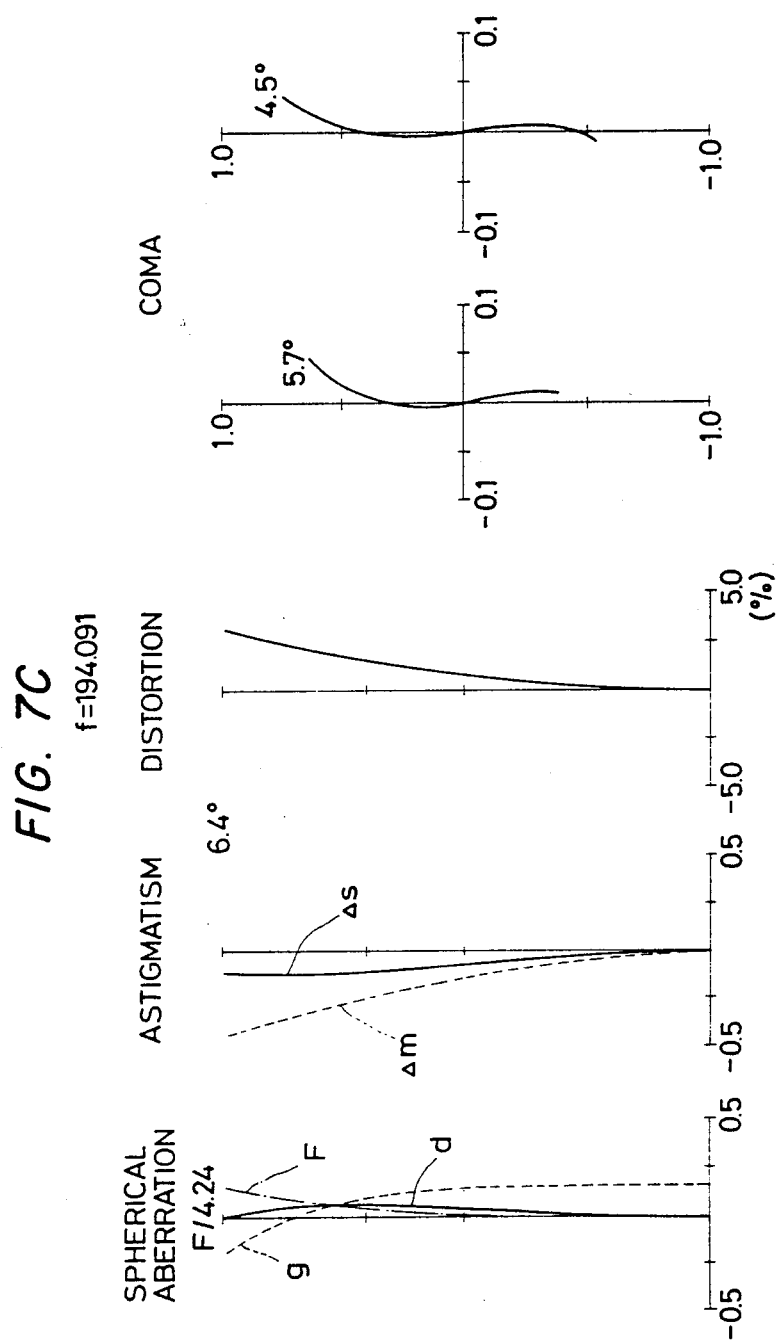

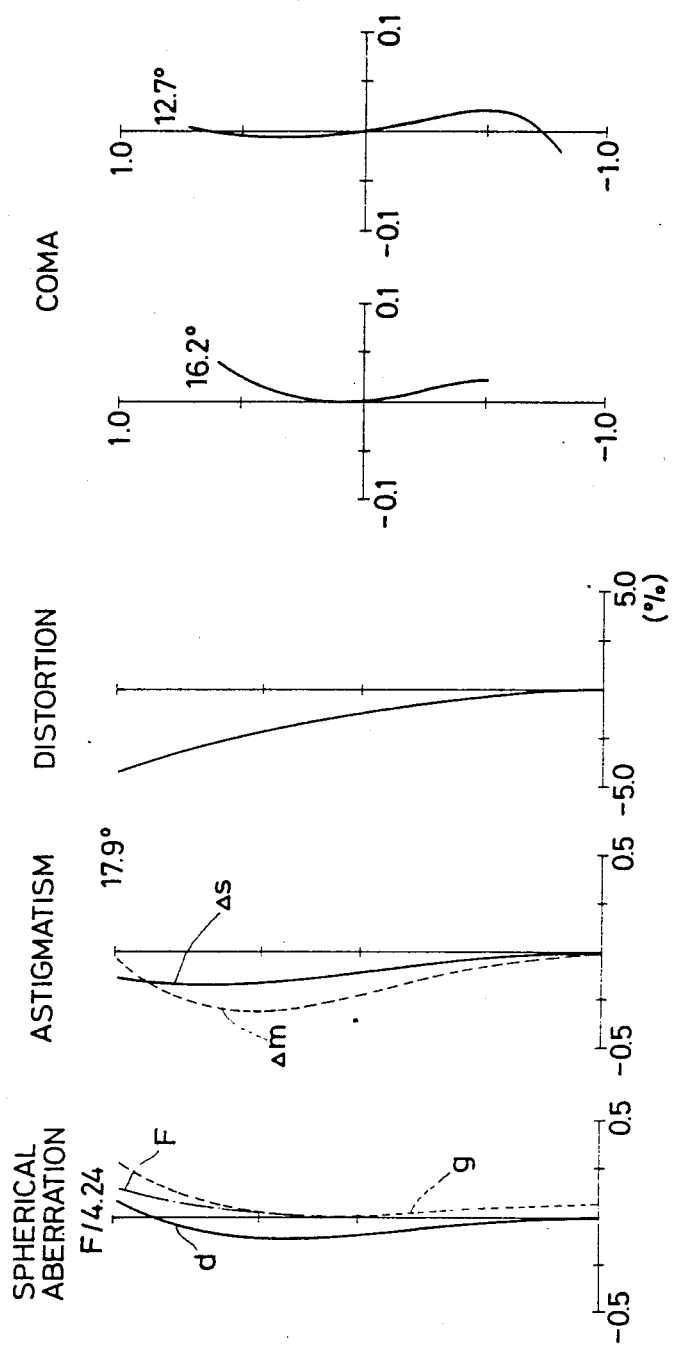

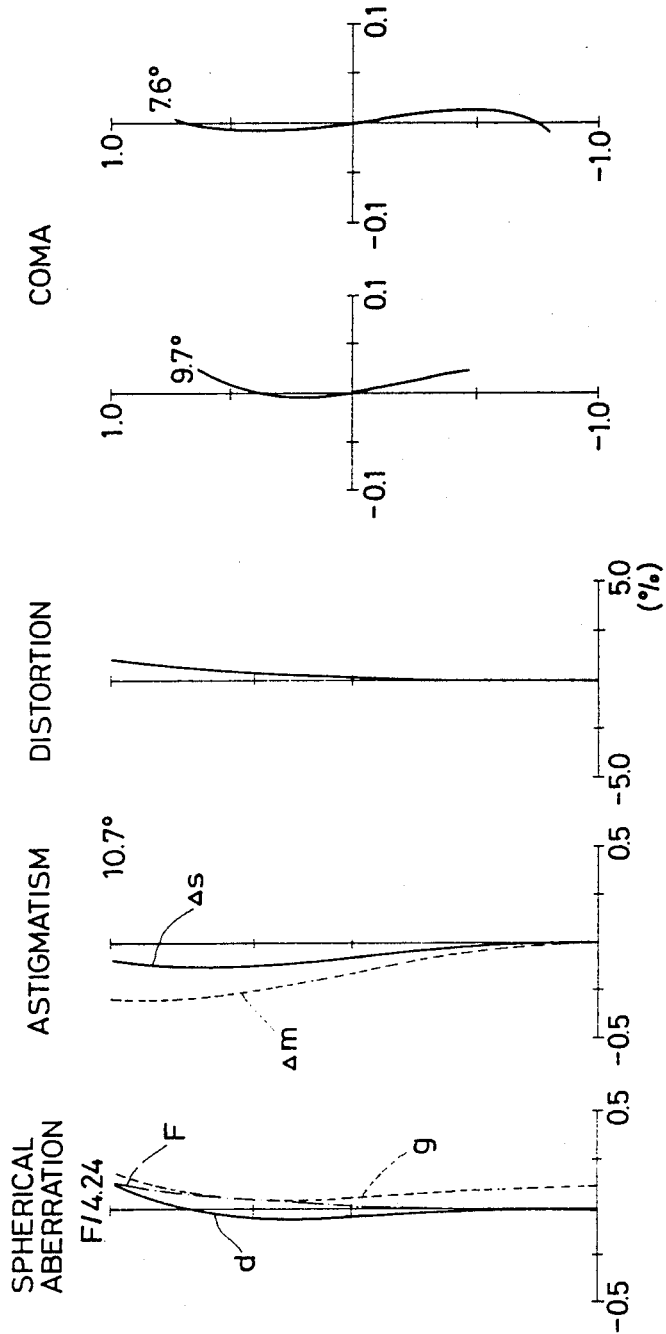

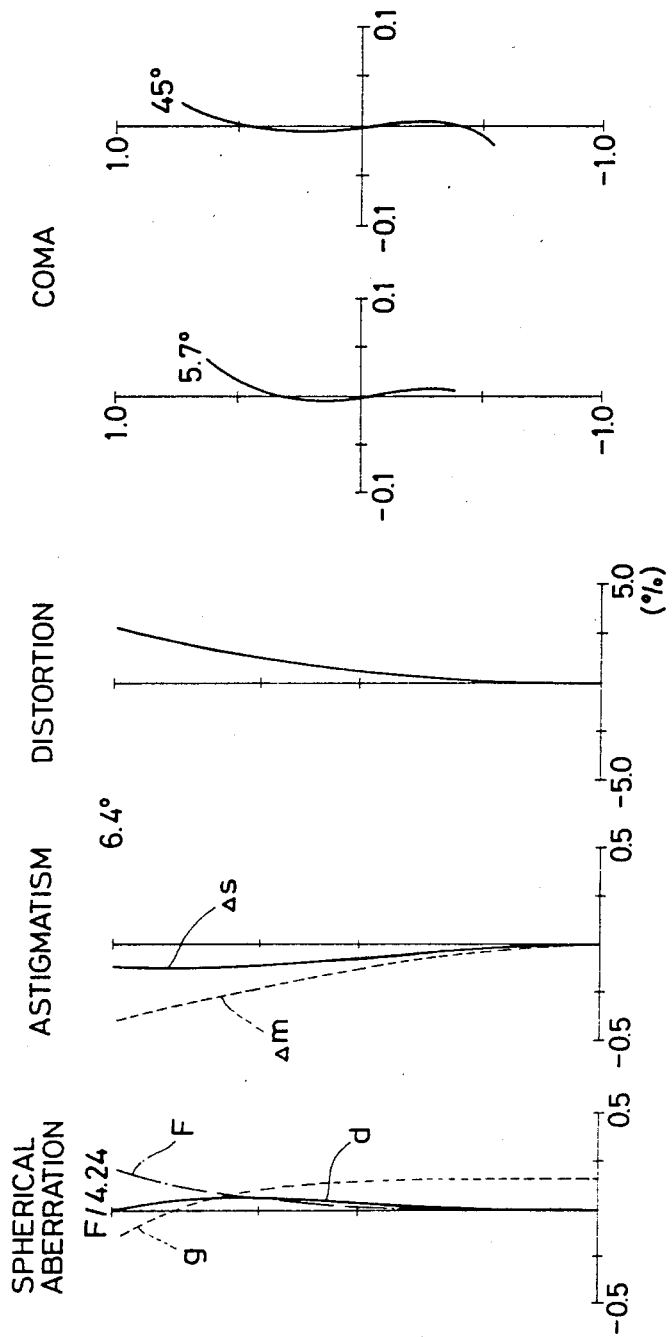

ZOOM LENS SYSTEM

BACKGROUND OF THE INVENTION (a) Field of the Invention

The present invention relates to a zoom lens system and, more particularly, to a zoom lens system comprising four lens group and having comparatively simple lens configuration.

(b) Description of the Prior Art

There are known zoom lens systems comprising four lens groups, i.e., a first, second, third and fourth lens groups, in which the first, second and third lens groups constitute a varifocal subsystem, the first lens group being a focusing lens group and having positive refractive power, the second lens group being a variator and having negative refractive power, the third lens group being a compensator and having positive refractive power, the fourth lens group being a relay lens arranged in rear of the varifocal subsystem. Among known zoom lens systems comprising four lens groups as described in the above, there are such known zoom lens systems in which the fourth lens group, i.e., the relay lens, is arranged to have simplified lens configuration in order to simplify the lens configuration of the lens system as a whole. Japanese published unexamined patent application No. 126819/81 discloses an example of known zoom lens systems in which the relay lens is arranged to have simplified lens configuration as described in the above. The relay lens of the known zoom lens system disclosed in the abovementioned Japanese published unexamined patent application comprises a lens component, which comprises a positive lens and negative lens arranged in the order from the object side (varifocal subsystem side) and has positive refractive power as a whole, a biconvex lens arranged by leaving a comparatively large airspace in respect to said lens component, and a negative meniscus lens arranged to be convex toward the image side. The relay lens of said known zoom lens system has a disadvantage that positive distortion caused by the negative meniscus lens, which is arranged on the image side, cannot be satisfactorily corrected on the long focal length side.

Another example of the above-mentioned known zoom lens systems is disclosed in Japanese published unexamined patent application No. 131852/78. The relay lens of the known zoom lens system disclosed in the above-mentioned Japanese published unexamined patent application comprises a lens component, which comprises a positive lens and negative lens and has positive refractive power as a whole, a negative meniscus lens arranged by leaving a comparatively large airspace in respect to said lens component and arranged to be convex toward the image side, and a positive lens. Said zoom lens system has a disadvantage that coma caused by the negative meniscus lens is large because the converging action in the position in rear of the relay lens is insufficient and, therefore, it is difficult to obtain favourable contrast of image.

SUMMARY OF THE INVENTION

It is, therefore a primary object of the present invention to provide a compact zoom lens system comprising a first lens group arranged as a focusing lens group and having positive refractive power, a second lens group arranged as a variator and having negative refractive power, a third lens group arranged as a compensator and having positive refractive power, said first, second and third lens groups constituting a varifocal subsystem, and a fourth lens group arranged as a relay lens and located in rear of said varifocal subsystem, said relay lens having comparatively simple lens configuration, said zoom lens system being small in size and light in weight and, at the same time, being arranged that aberrations, especially coma flare, are corrected favourably.

The zoom lens system according to the present invention comprises, as shown in FIG. 1 or FIG. 2, the first lens group I having positive refractive power, the second lens group II having negative refractive power, the third lens group III having positive refractive power, and the fourth lens group IV, the first, second and third lens groups constituting a varifocal subsystem, and the fourth lens group constituting a relay lens. The fourth lens group IV which is the relay lens comprises, in the order from the object side, a first lens component $IV_a$ comprising a positive lens and a negative lens and having positive refractive power as a whole, a second lens component $IV_b$ comprising a positive lens and arranged by leaving a certain airspace in respect to the first lens component $IV_a$, a third lens component $IV_c$ comprising a negative lens, and a fourth lens component $IV_d$ comprising a positive lens. Here, by arranging the second lens component $IV_b$ on the object side of and with a certain airspace in respect to the third lens component $IV_c$, heights of rays incident on the third lens component $IV_c$ are made small so that coma is prevented from occurring. Besides, by arranging the fourth lens component $IV_d$ on the image side of and at a certain distance from the third lens component $IV_c$, distortion especially positive distortion on the long focal length side is prevented from occurring.

The zoom lens system according to the present invention is arranged that the fourth lens group, i.e., the relay lens, is simplified by arranging that the fourth lens group has the lens configuration as described in the above, and aberrations of the lens system as a whole is thereby corrected favourably.

When, however, the fourth lens group IV is arranged to fulfill the conditions (1) and (2) shown below, it is possible to correct aberrations more favourably:

$$0.3 < f_{4a}/f_4 < 3.0 \tag{1}$$

$$0.03 < f_{4c}/f_{4bcd} < 0.3 \tag{2}$$

where, reference symbol $f_4$ represents the focal length of the fourth lens groups IV, reference symbol $f_{4a}$ represents the focal length of the first lens component $IV_a$ in the fourth lens group, reference symbol $f_{4c}$ represents the focal length of the third lens component $IV_c$ in the fourth lens group, and reference symbol $f_{4bcd}$ represents the total focal length of the second lens component $IV_b$, the third lens component $IV_c$ and the fourth lens component $IV_d$ which constitute the fourth lens group.

When $f_{4a}/f_4$ become smaller than the lower limit of the condition (1), it is possible to make the telephoto ratio small. However, aberrations to be caused become large and it is difficult to correct them, especially spherical aberration, favourably. When $f_{4a}/f_a$ becomes larger than the upper limit of the condition (1), the fourth lens group IV becomes large and it is impossible to make the zoom lens system as a whole compact.

When $f_{4c}/f_{4bcd}$ becomes smaller than the lower limit of the condition (2), refractive power of the third lens component $IV_c$ in the fourth lens group becomes strong, and it is difficult to correct coma favourably. When $f_{4c}/f_{4bdc}$ becomes larger than the upper limit of the condition (2), it is difficult to correct curvature of field favourably.

For correction of curvature of field, the shape of the third lens component $IV_c$ in the fourth lens group has large influence. Therefore, to correct curvature of field more favourably, it is preferable to fulfill the condition (3) shown below in additional to the conditions (1) and (2):

$$1.0 < \left| \frac{r_{4c1} + r_{4c2}}{r_{4c1} - r_{4c2}} \right| < 3.0 \tag{3}$$

where, reference symbols $r_{4c1}$ and $r_{4c2}$ respectively represent radii of curvature of the surface on the object side and surface on the image side of the third lens component $IV_c$ in the fourth lens group.

When the value defined by the condition (3) becomes smaller than the lower limit thereof, curvature of field becomes unfavourable on the short focal length side. When the value defined by the condition (3) becomes larger than the upper limits thereof, negative curvature of field occurs on the long focal length side. In either case, it is difficult to correct curvature of field favourably.

To correct distortion more favourably, it is preferable to fulfill the condition (4) shown below:

$$0.01 < D/f_W < 0.3 \tag{4}$$

where, reference symbol D represents the airspace between the third lens component $IV_c$ and the fourth lens component $IV_d$ in the fourth lens group, and reference symbol $f_W$ represents the focal length of the zoom lens system as a whole on the short focal length side.

When $D/f_W$ becomes smaller than the lower limit of the condition (4), it is difficult to correct positive distortion. When $D/f_W$ becomes larger than the upper limit of the condition (4), the diameter of the fourth lens component $IV_d$ becomes larger, and it is impossible to obtain a compact zoom lens system which is one of objects of the present invention.

BRIEF DESCRIPTION OF THE DRAWINGS

FIGS. 3A, 3B and 3C respectively show graphs illustrating aberration curves of Embodiment 1 of the present invention;

FIGS. 4A, 4B and 4C respectively show graphs illustrating aberration curves of Embodiment 2 of the present invention;

FIGS. 5A, 5B and 5C respectively show graphs illustrating aberration curves of Embodiment 3 of the present invention;

FIGS. 6A, 6B and 6C respectively show graphs illustrating aberration curves of Embodiment 4 of the present invention;

FIGS. 7A, 7B and 7C respectively show graphs illustrating aberration curves of Embodiment 5 of the present invention; and FIGS. 8A, 8B and 8C respectively show graphs illustrating aberration curves of Embodiment 6 of the present invention.

DETAILED DESCRIPTION OF THE PREFERRED EMBODIMENTS

Figure 1:
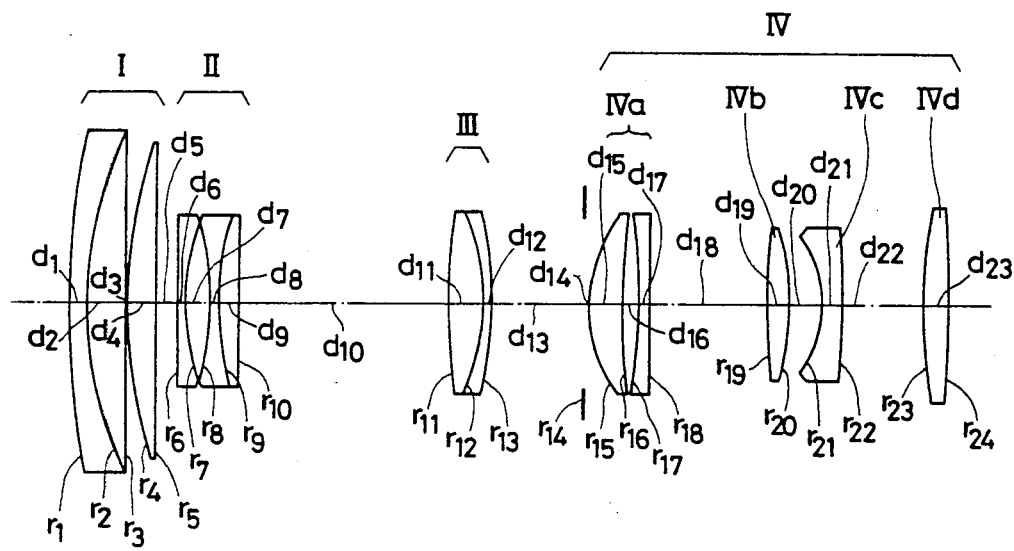
FIG. 1 shows a sectional view of Embodiments 1 and 2 of the zoom lens system according to the present invention.

Now, preferred embodiments of the zoom lens system according to the present invention described so far are shown below.

Embodiment 1

| | | | |
|---|---|---|---|
| $r_1 = 144.9108$ | | | |
| $d_1 = 2.8000$ | $n_1 = 1.80518$ | $\nu_1 = 25.43$ |
| $r_2 = 68.2361$ | | | |
| $d_2 = 6.6000$ | $n_2 = 1.61272$ | $\nu_2 = 58.75$ |
| $r_3 = -5481.9920$ | | | |
| $d_3 = 0.2000$ | | | |
| $r_4 = 89.3518$ | | | |
| $d_4 = 4.7000$ | $n_3 = 1.61272$ | $\nu_3 = 58.75$ |
| $r_5 = 11352.4996$ | | | |
| $d_5 = D_1$ (variable) | | | |
| $r_6 = 648.1213$ | | | |
| $d_6 = 1.5000$ | $n_4 = 1.713000$ | $\nu_4 = 53.84$ |
| $r_7 = 40.1579$ | | | |
| $d_7 = 4.2000$ | | | |
| $r_8 = -45.2768$ | | | |
| $d_8 = 1.5000$ | $n_5 = 1.71300$ | $\nu_5 = 53.84$ |
| $r_9 = 45.7879$ | | | |
| $d_9 = 3.4000$ | $n_6 = 1.84666$ | $\nu_6 = 23.88$ |
| $r_{10} = -6737.4941$ | | | |
| $d_{10} = D_2$ (variable) | | | |
| $r_{11} = 112.8992$ | | | |
| $d_{11} = 5.8000$ | $n_7 = 1.51633$ | $\nu_7 = 64.15$ |
| $r_{12} = -32.3291$ | | | |
| $d_{12} = 1.5000$ | $n_8 = 1.75520$ | $\nu_8 = 27.51$ |
| $r_{13} = -57.1632$ | | | |
| $d_{13} = D_3$ (variable) | | | |
| $r_{14} = \infty$ (stop) | | | |
| $d_{14} = 1.0000$ | | | |
| $r_{15} = 24.5802$ | | | |
| $d_{15} = 5.6126$ | $n_9 = 1.50048$ | $\nu_9 = 68.70$ |
| $r_{16} = 185.4000$ | | | |
| $d_{16} = 2.2118$ | | | |
| $r_{17} = -118.4028$ | | | |
| $d_{17} = 2.0078$ | $n_{10} = 1.80610$ | $\nu_{10} = 35.22$ |
| $r_{18} = -1060.6686$ | | | |
| $d_{18} = 19.216$ | | | |
| $r_{19} = 148.6683$ | | | |
| $d_{19} = 3.6148$ | $n_{11} = 1.51742$ | $\nu_{11} = 52.41$ |
| $r_{20} = -38.3100$ | | | |
| $d_{20} = 5.2560$ | | | |
| $r_{21} = -18.8457$ | | | |
| $d_{21} = 3.0815$ | $n_{12} = 1.77250$ | $\nu_{12} = 49.66$ |
| $r_{22} = -146.5229$ | | | |
| $d_{22} = 13.4117$ | | | |
| $r_{23} = 90.1033$ | | | |
| $d_{23} = 4.1132$ | $n_{13} = 1.51112$ | $\nu_{13} = 60.48$ |
| $r_{24} = -194.4020$ | | | |

$f = 70.019 \sim 136.124 \sim 203.770$
$f_{4a} = 79.944$, $\quad f_4 = 112.031$
$f_{4a}/f_4 = 0.7136$, $\quad f_{4c} = -28.294$
$f_{4bcd} = -176.874$, $\quad f_{4c}/f_{4bcd} = 0.160$ $\left| \dfrac{r_{4c1} + r_{4c2}}{r_{4c1} - r_{4c2}} \right| = 1.2952$, $D/f_W = 0.192$

| f | 70.019 | 136.124 | 203.770 |
|---|---|---|---|
| $D_1$ | 3.253 | 32.663 | 43.108 |
| $D_2$ | 34.766 | 17.756 | 0.186 |
| $D_3$ | 16.055 | 3.655 | 10.780 |

Embodiment 2

| | | | |
|---|---|---|---|
| $r_1 = 142.9968$ | | | |
| $d_1 = 2.8000$ | $n_1 = 1.80518$ | $\nu_1 = 25.43$ |

-continued

Embodiment 2

| | | |
|---|---|---|
| $r_2 = 67.9794$ | | |
| $d_2 = 6.6000$ | $n_2 = 1.61272$ | $\nu_2 = 58.75$ |
| $r_3 = -6530.3523$ | | |
| $d_3 = 0.2000$ | | |
| $r_4 = 94.0605$ | | |
| $d_4 = 4.7000$ | $n_3 = 1.61272$ | $\nu_3 = 58.75$ |
| $r_5 = 12155.0599$ | | |
| $d_5 = D_1$ (variable) | | |
| $r_6 = 454.0262$ | | |
| $d_6 = 1.5000$ | $n_4 = 1.71300$ | $\nu_4 = 53.84$ |
| $r_7 = 40.3500$ | | |
| $d_7 = 4.2000$ | | |
| $r_8 = -45.1046$ | | |
| $d_8 = 1.5000$ | $n_5 = 1.71300$ | $\nu_5 = 53.84$ |
| $r_9 = 46.0978$ | | |
| $d_9 = 3.4000$ | $n_6 = 1.84666$ | $\nu_6 = 23.88$ |
| $r_{10} = -2104.2705$ | | |
| $d_{10} = D_2$ (variable) | | |
| $r_{11} = 111.8042$ | | |
| $d_{11} = 5.8000$ | $n_7 = 1.51633$ | $\nu_7 = 64.15$ |
| $r_{12} = -32.3806$ | | |
| $d_{12} = 1.5000$ | $n_8 = 1.75520$ | $\nu_8 = 27.51$ |
| $r_{13} = -56.6383$ | | |
| $d_{13} = D_3$ (variable) | | |
| $r_{14} = \infty$ (stop) | | |
| $d_{14} = 1.0000$ | | |
| $r_{15} = 29.2023$ | | |
| $d_{15} = 5.5711$ | $n_9 = 1.50048$ | $\nu_9 = 68.86$ |
| $r_{16} = -12111.2296$ | | |
| $d_{16} = 2.1862$ | | |
| $r_{17} = -102.6169$ | | |
| $d_{17} = 1.9800$ | $n_{10} = 1.80610$ | $\nu_{10} = 38.27$ |
| $r_{18} = 771.0715$ | | |
| $d_{18} = 19.2054$ | | |
| $r_{19} = 138.6019$ | | |
| $d_{19} = 3.5882$ | $n_{11} = 1.51742$ | $\nu_{11} = 52.41$ |
| $r_{20} = -64.0731$ | | |
| $d_{20} = 14.8972$ | | |
| $r_{21} = -20.3040$ | | |
| $d_{21} = 1.6732$ | $n_{12} = 1.77250$ | $\nu_{12} = 49.66$ |
| $r_{22} = -91.1372$ | | |
| $d_{22} = 5.2036$ | | |
| $r_{23} = 120.8274$ | | |
| $d_{23} = 4.0093$ | $n_{13} = 1.51112$ | $\nu_{13} = 60.48$ |
| $r_{24} = -90.7416$ | | |

$f = 70.019 \sim 136.124 \sim 203.77$
$f_{4a} = 108.832, \quad f_4 = 115.886$
$f_{4a}/f_4 = 0.9391, \quad f_{4c} = -34.169$
$f_{4bdc} = -306.646, \quad f_{4c}/f_{4bdc} = 0.1114$ $\left| \dfrac{r_{4c1} + r_{4c2}}{r_{4c1} - r_{4c2}} \right| = 1.5733, \quad D/f_W = 0.074$

| f | 70.019 | 136.124 | 203.77 |
|---|---|---|---|
| $D_1$ | 1.141 | 32.722 | 43.856 |
| $D_2$ | 34.231 | 17.360 | 0.058 |
| $D_3$ | 18.913 | 4.203 | 10.371 |

Embodiment 3

| | | |
|---|---|---|
| $r_1 = 127.9700$ | | |
| $d_1 = 2.6000$ | $n_1 = 1.78472$ | $\nu_1 = 25.68$ |
| $r_2 = 58.4160$ | | |
| $d_2 = 6.8000$ | $n_2 = 1.62280$ | $\nu_2 = 57.06$ |
| $r_3 = \infty$ | | |
| $d_3 = 0.1500$ | | |
| $r_4 = 86.2160$ | | |
| $d_4 = 4.6000$ | $n_3 = 1.62299$ | $\nu_3 = 58.14$ |
| $r_5 = \infty$ | | |
| $d_5 = D_1$ (variable) | | |
| $r_6 = -212.4540$ | | |
| $d_6 = 1.7000$ | $n_4 = 1.74320$ | $\nu_4 = 49.31$ |
| $r_7 = 24.1010$ | | |
| $d_7 = 3.4000$ | $n_5 = 1.78472$ | $\nu_5 = 25.68$ |
| $r_8 = 35.6490$ | | |
| $d_8 = 4.0000$ | | |

-continued

Embodiment 3

| | | |
|---|---|---|
| $r_9 = -53.1720$ | | |
| $d_9 = 1.6000$ | $n_6 = 1.77250$ | $\nu_6 = 49.66$ |
| $r_{10} = 95.6530$ | | |
| $d_{10} = 0.6400$ | | |
| $r_{11} = 68.3100$ | | |
| $d_{11} = 3.2000$ | $n_7 = 1.78472$ | $\nu_7 = 25.68$ |
| $r_{12} = -233.9170$ | | |
| $d_{12} = D_2$ (variable) | | |
| $r_{13} = 117.3390$ | | |
| $d_{13} = 5.8000$ | $n_8 = 1.51112$ | $\nu_8 = 60.48$ |
| $r_{14} = -30.7220$ | | |
| $d_{14} = 2.0000$ | $n_9 = 1.78472$ | $\nu_9 = 25.68$ |
| $r_{15} = -52.8370$ | | |
| $d_{15} = D_3$ (variable) | | |
| $r_{16} = \infty$ (stop) | | |
| $d_{16} = 1.7000$ | | |
| $r_{17} = 26.1193$ | | |
| $d_{17} = 5.6000$ | $n_{10} = 1.51112$ | $\nu_{10} = 60.48$ |
| $r_{18} = 470.2221$ | | |
| $d_{18} = 1.9600$ | | |
| $r_{19} = -125.9016$ | | |
| $d_{19} = 1.60000$ | $n_{11} = 1.83400$ | $\nu_{11} = 37.16$ |
| $r_{20} = 154.9461$ | | |
| $d_{20} = 19.9900$ | | |
| $r_{21} = 63.8585$ | | |
| $d_{21} = 3.5300$ | $n_{12} = 1.51742$ | $\nu_{12} = 52.41$ |
| $r_{22} = -54.7038$ | | |
| $d_{22} = 10.9200$ | | |
| $r_{23} = -20.1245$ | | |
| $d_{23} = 2.0600$ | $n_{13} = 1.77250$ | $\nu_{13} = 49.66$ |
| $r_{24} = -81.2528$ | | |
| $d_{24} = 9.3286$ | | |
| $r_{25} = 61.1383$ | | |
| $d_2 = 4.0000$ | $n_{14} = 1.51112$ | $\nu_{14} = 60.48$ |
| $r_{26} = 118.9530$ | | |

$f = 66.922 \sim 113.933 \sim 194.051$
$f_{4a} = 126.251, \quad f_4 = 117.668$
$f_{4a}/f_4 = 1.0729, \quad f_{4c} = -35.144$
$f_{4bcd} = -547.444, \quad f_{4c}/f_{4bcd} = 0.0642$ $\left| \dfrac{r_{4c1} + r_{4c2}}{r_{4c1} - r_{4c2}} \right| = 1.6584, \quad D/f_W = 0.139$

| f | 66.922 | 113.933 | 194.051 |
|---|---|---|---|
| $D_1$ | 2.191 | 24.467 | 37.535 |
| $D_2$ | 36.355 | 23.260 | 0.975 |
| $D_3$ | 10.982 | 1.800 | 11.017 |

Embodiment 4

| | | |
|---|---|---|
| $r_1 = 125.0059$ | | |
| $d_1 = 2.6000$ | $n_1 = 1.78472$ | $\nu_1 = 25.68$ |
| $r_2 = 58.4160$ | | |
| $d_2 = 6.8000$ | $n_2 = 1.62299$ | $\nu_2 = 58.14$ |
| $r_3 = \infty$ | | |
| $d_3 = 0.1500$ | | |
| $r_4 = 88.0510$ | | |
| $d_4 = 4.6000$ | $n_3 = 1.62299$ | $\nu_3 = 58.14$ |
| $r_5 = \infty$ | | |
| $d_5 = D_1$ (variable) | | |
| $r_6 = -212.4540$ | | |
| $d_6 = 1.7000$ | $n_4 = 1.74320$ | $\nu_4 = 49.31$ |
| $r_7 = 24.1010$ | | |
| $d_7 = 3.4000$ | $n_5 = 1.78472$ | $\nu_5 = 25.68$ |
| $r_8 = 35.6490$ | | |
| $d_8 = 4.0000$ | | |
| $r_9 = -53.1720$ | | |
| $d_9 = 1.6000$ | $n_6 = 1.77250$ | $\nu_6 = 49.66$ |
| $r_{10} = 95.6530$ | | |
| $d_{10} = 0.6400$ | | |
| $r_{11} = 68.3100$ | | |
| $d_{11} = 3.2000$ | $n_7 = 1.78472$ | $\nu_7 = 25.68$ |
| $r_{12} = -233.9318$ | | |
| $d_{12} = D_2$ (variable) | | |
| $r_{13} = 117.3390$ | | |
| $d_{13} = 5.8000$ | $n_8 = 1.51112$ | $\nu_8 = 60.48$ |

Embodiment 4

| | | | |
|---|---|---|---|
| $r_{14} = -30.7220$ | | | |
| | $d_{14} = 2.0000$ | $n_9 = 1.78472$ | $\nu_9 = 25.68$ |
| $r_{15} = -52.8370$ | | | |
| | $d_{15} = D_3$ (variable) | | |
| $r_{16} = \infty$ (stop) | | | |
| | $d_{16} = 1.7000$ | | |
| $r_{17} = 26.4827$ | | | |
| | $d_{17} = 5.6000$ | $n_{10}$ 1.50048 | $\nu_{10} = 65.99$ |
| $r_{18} = \infty$ | | | |
| | $d_{18} = 2.2000$ | | |
| $r_{19} = -128.0029$ | | | |
| | $d_{19} = 2.0000$ | $n_{11} = 1.80610$ | $\nu_{11} = 40.95$ |
| $r_{20} = 199.5243$ | | | |
| | $d_{20} = 19.9834$ | | |
| $r_{21} = 100.7291$ | | | |
| | $d_{21} = 3.6000$ | $n_{12} = 1.51742$ | $\nu_{12} = 52.41$ |
| $r_{22} = -63.4132$ | | | |
| | $d_{22} = 10.9209$ | | |
| $r_{23} = -19.6359$ | | | |
| | $d_{23} = 1.8000$ | $n_{13} = 1.77250$ | $\nu_{13} = 49.66$ |
| $r_{24} = -81.8964$ | | | |
| | $d_{24} = 8.5646$ | | |
| $r_{25} = 113.1923$ | | | |
| | $d_{25} = 4.0000$ | $n_{14} = 1.51112$ | $\nu_{14} = 60.48$ |
| $r_{26} = -132.6134$ | | | |

$f = 66.923 \sim 113.941 \sim 194.149$
$f_{4a} = 102.258,$  $f_4 = 117.565$
$f_{4a}/f_4 = 0.8698,$  $f_{4c} = -33.862$
$f_{4bcd} = -271.117,$  $f_{4c}/f_{4bcd} = 0.1249$ $$\left| \frac{r_{4c1} + r_{4c2}}{r_{4c1} - r_{4c2}} \right| = 1.6308, \ D/f_W = 0.128$$

| f | 66.923 | 113.941 | 194.149 |
|---|---|---|---|
| $D_1$ | 2.128 | 24.404 | 37.471 |
| $D_2$ | 36.355 | 23.260 | 0.976 |
| $D_3$ | 10.982 | 1.800 | 11.017 |

Embodiment 5

| | | | |
|---|---|---|---|
| $r_1 = 127.9700$ | | | |
| | $d_1 = 2.6000$ | $n_1 = 1.78472$ | $\nu_1 = 25.68$ |
| $r_2 = 58.4160$ | | | |
| | $d_2 = 6.8000$ | $n_2 = 1.62280$ | $\nu_2 = 57.06$ |
| $r_3 = \infty$ | | | |
| | $d_3 = 0.1500$ | | |
| $r_4 = 86.2160$ | | | |
| | $d_4 = 4.6000$ | $n_3$ 1.62299 | $\nu_3 = 58.14$ |
| $r_5 = \infty$ | | | |
| | $d_5 = D_1$ (variable) | | |
| $r_6 = -212.4540$ | | | |
| | $d_6 = 1.7000$ | $n_4 = 1.74320$ | $\nu_4 = 49.31$ |
| $r_7 = 24.1010$ | | | |
| | $d_7 = 3.4000$ | $n_5 = 1.78472$ | $\nu_5 = 25.68$ |
| $r_8 = 35.6490$ | | | |
| | $d_8 = 4.0000$ | | |
| $r_9 = -53.1720$ | | | |
| | $d_9 = 1.6000$ | $n_6 = 1.77250$ | $\nu_6 = 49.66$ |
| $r_{10} = 95.6530$ | | | |
| | $d_{10} = 0.6400$ | | |
| $r_{11} = 68.3100$ | | | |
| | $d_{11} = 3.2000$ | $n_7 = 1.78472$ | $\nu_7 = 25.68$ |
| $r_{12} = -233.9170$ | | | |
| | $d_{12} = D_2$ (variable) | | |
| $r_{13} = 117.3390$ | | | |
| | $d_{13} = 5.8000$ | $n_8 = 1.51112$ | $\nu_8 = 60.48$ |
| $r_{14} = -30.7220$ | | | |
| | $d_{14} = 2.0000$ | $n_9 = 1.78472$ | $\nu_9 = 25.68$ |
| $r_{15} = -52.8370$ | | | |
| | $d_{15} = D_3$ (variable) | | |
| $r_{16} = \infty$ (stop) | | | |
| | $d_{16} = 1.8494$ | | |
| $r_{17} = 26.7721$ | | | |
| | $d_{17} = 5.6000$ | $n_{10} = 1.50048$ | $\nu_{10} = 65.99$ |
| $r_{18} = 5065.7532$ | | | |
| | $d_{18} = 2.2000$ | | |

Embodiment 5 -continued

| | | | |
|---|---|---|---|
| $r_{19} = -117.1642$ | | | |
| | $d_{19} = 2.0000$ | $n_{11} = 1.80610$ | $\nu_{11} = 40.95$ |
| $r_{20} = 190.9331$ | | | |
| | $d_{20} = 19.9824$ | | |
| $r_{21} = 72.4887$ | | | |
| | $d_{21} = 3.6000$ | $n_{12} = 1.51742$ | $\nu_{12} = 52.41$ |
| $r_{22} = -57.4998$ | | | |
| | $d_{22} = 10.9196$ | | |
| $r_{23} = -20.2962$ | | | |
| | $d_{23} = 1.8000$ | $n_{13} = 1.77250$ | $\nu_{13} = 49.66$ |
| $r_{24} = -108.8218$ | | | |
| | $d_{24} = 8.4955$ | | |
| $r_{25} = 89.8728$ | | | |
| | $d_{25} = 4.0000$ | $n_{14} = 1.51112$ | $\nu_{14} = 60.48$ |
| $r_{26} = -447.2719$ | | | |

$f = 66.923 \sim 113.901 \sim 194.091$
$f_{4a} = 113.799,$  $f_4 = 117.616$
$f_{4a}/f_4 = 0.9675,$  $f_c = -32.586$
$f_{4bcd} = -358.677,$  $f_{4c}/f_{4bcd} = 0.0909$ $$\left| \frac{r_{4c1} + r_{4c2}}{r_{4c1} - r_{4c2}} \right| = 1.4585, \ D/f_W = 0.127$$

| f | 66.923 | 113.901 | 194.091 |
|---|---|---|---|
| $D_1$ | 2.208 | 24.448 | 37.516 |
| $D_2$ | 36.355 | 23.260 | 0.975 |
| $D_3$ | 10.982 | 1.800 | 11.017 |

Embodiment 6

| | | | |
|---|---|---|---|
| $r_1 = 127.9700$ | | | |
| | $d_1 = 2.6000$ | $n_1 = 1.78472$ | $\nu_1 = 25.68$ |
| $r_2 = 58.4160$ | | | |
| | $d_2 = 6.800$ | $n_2 = 1.62280$ | $\nu_2 = 57.06$ |
| $r_3 = \infty$ | | | |
| | $d_3 = 0.1500$ | | |
| $r_4 = 86.2160$ | | | |
| | $d_4 = 4.6000$ | $n_3 = 1.62299$ | $\nu_3 = 58.14$ |
| $r_5 = \infty$ | | | |
| | $d_5 = D_1$ (variable) | | |
| $r_6 = -212.4540$ | | | |
| | $d_6 = 1.7000$ | $n_4 = 1.74320$ | $\nu_4 = 49.31$ |
| $r_7 = 24.1010$ | | | |
| | $d_7 = 3.4000$ | $n_5 = 1.78472$ | $\nu_5 = 25.68$ |
| $r_8 = 35.6490$ | | | |
| | $d_8 = 4.0000$ | | |
| $r_9 = -53.1720$ | | | |
| | $d_9 = 1.6000$ | $n_6 = 1.77250$ | $\nu_6 = 49.66$ |
| $r_{10} = 95.6530$ | | | |
| | $d_{10} = 0.6400$ | | |
| $r_{11} = 68.3100$ | | | |
| | $d_{11} = 3.2000$ | $n_7 = 1.78472$ | $\nu_7 = 25.68$ |
| $r_{12} = -233.9170$ | | | |
| | $d_{12} = D_2$ (variable) | | |
| $r_{13} = 117.3390$ | | | |
| | $d_{13} = 5.8000$ | $n_8 = 1.51112$ | $\nu_8 = 60.48$ |
| $r_{14} = -30.7220$ | | | |
| | $d_{14} = 2.0000$ | $n_9 = 1.78472$ | $\nu_9 = 25.68$ |
| $r_{15} = -52.8370$ | | | |
| | $d_{15} = D_3$ (variable) | | |
| $r_{16} = \infty$ (stop) | | | |
| | $d_{16} = 1.7000$ | | |
| $r_{17} = 26.7709$ | | | |
| | $d_{17} = 5.6000$ | $n_{10} = 1.51112$ | $\nu_{10} = 60.48$ |
| $r_{18} = \infty$ | | | |
| | $d_{18} = 2.2000$ | | |
| $r_{19} = -118.1771$ | | | |
| | $d_{19} = 2.0000$ | $n_{11} = 1.83400$ | $\nu_{11} = 37.16$ |
| $r_{20} = 178.9330$ | | | |
| | $d_{20} = 19.9892$ | | |
| $r_{21} = 71.6571$ | | | |
| | $d_{21} = 3.6000$ | $n_{12} = 1.51742$ | $\nu_{12} = 52.41$ |
| $r_{22} = -56.5196$ | | | |
| | $d_{22} = 10.9200$ | | |
| $r_{23} = -20.1562$ | | | |
| | $d_{23} = 1.8000$ | $n_{13} = 1.77250$ | $\nu_{13} = 49.66$ |

-continued

Embodiment 6

$r_{24} = -129.7039$
$d_{24} = 8.4593$
$r_{25} = 84.9757$
$d_{25} = 4.0000$   $n_{14}\ 1.51112$   $\nu_{14} = 60.48$
$r_{26} = -266.5989$ $f = 66.923 \sim 113.901 \sim 194.090$
$f_{4a} = 114.146,\qquad f_4 = 117.603$
$f_{4a}/f_4 = 0.9706,\qquad f_{4c} = -31.116$
$f_{4bcd} = -386.461,\qquad f_{4c}/f_{4bcd} = 0.0805$ $$\left|\frac{r_{4c1} + r_{4c2}}{r_{4c1} - r_{4c2}}\right| = 1.368,\ D/f_W = 0.126$$

| f | 66.923 | 113.901 | 194.090 |
|---|---|---|---|
| $D_1$ | 2.208 | 24.448 | 37.516 |
| $D_2$ | 36.355 | 23.260 | 0.975 |
| $D_3$ | 10.982 | 1.800 | 11.017 |

In embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, and reference symbol f represents the focal length of the lens system as a whole.

Out of respective embodiments shown in the above, Embodiments 1 and 2 respectively have the lens configuration shown in FIG. 1. That is, in the zoom lens systems according to Embodiments 1 and 2, the first lens groups I comprises a positive cemented doublet and a positive lens, the second lens group II comprises a negative lens and a negative cemented doublet, and the third lens group III comprises a positive cemented doublet. The fourth lens group IV comprises, as described before, the first lens component $IV_a$ comprising a positive lens and a negative lens and having positive refractive power as a whole, the second lens component $IV_b$ comprising a positive lens, the third lens component $IV_c$ comprising a negative lens, and the fourth lens component $IV_d$ comprising a positive lens. In these embodiments, the focal length is varied by varying the airspaces $d_5 = D_1$, $d_{10} = D_2$ and $d_{13} = D_3$ as shown in the numerical data of said embodiments.

Figure 2:
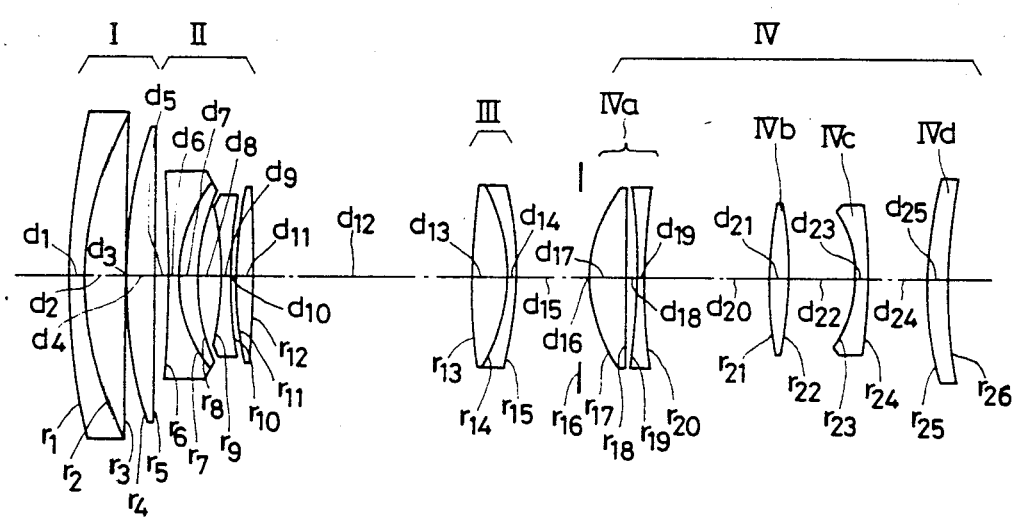
FIG. 2 shows a sectional view of Embodiments 3 through 6 of the zoom lens system according to the present invention.
Figure 5B:
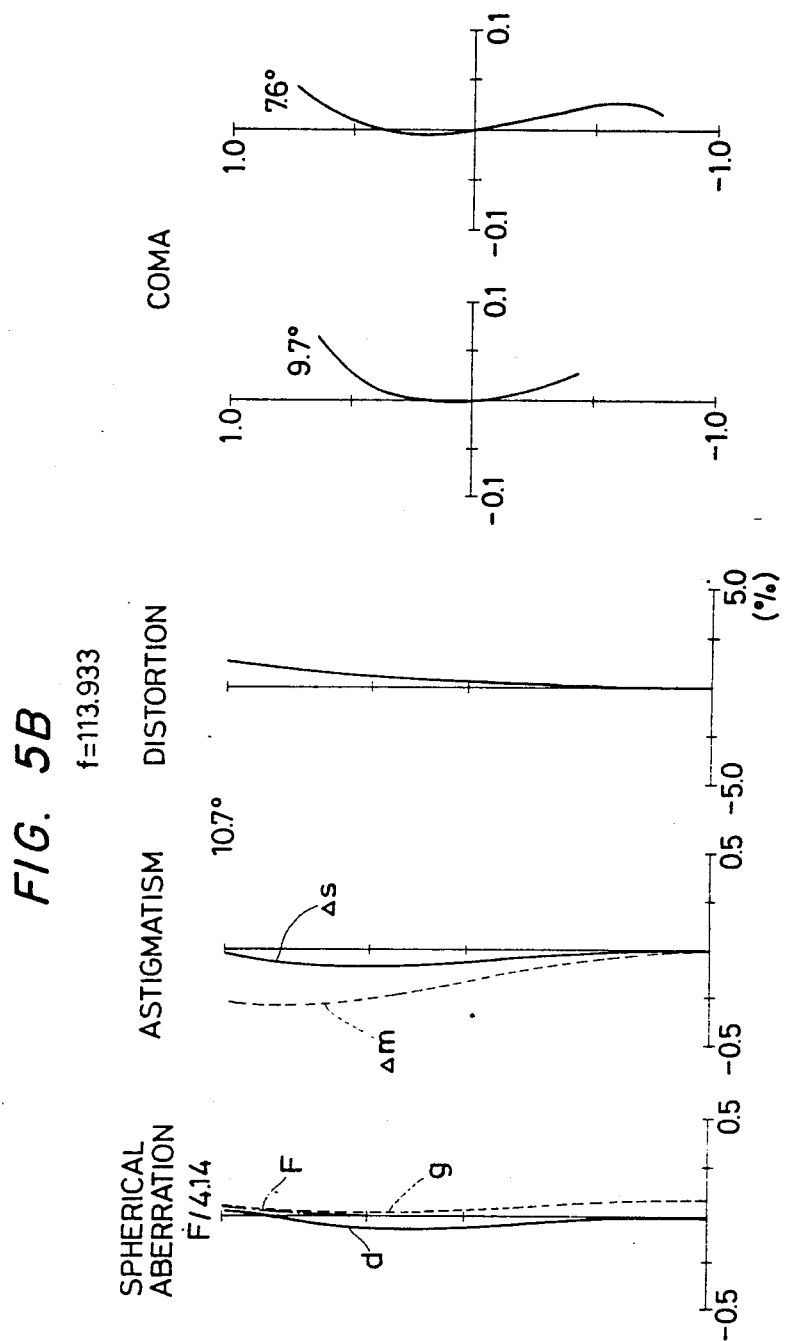

Embodiments 3 through 6 respectively have the lens configuration shown in FIG. 2. That is, in these embodiments, the second lens group comprises a negative cemented doublet, a negative lens and a positive lens. The lens configuration of the other lens groups is substantially the same as that of the lens system shown in FIG. 1. In these embodiments, the focal length is varied by varying the airspaces $d_5 = D_1$, $d_{12} = D_2$ and $d_{15} = D_3$ as shown in the numerical data of said embodiments.

Out of graphs illustrating aberration curves of respective embodiments, FIGS. 3A, 4A, 5A, 6A, 7A and 8A respectively show the aberration curves on the short focal length side, FIGS. 3B, 4B, 5B, 6B, 7B and 8B respectively show the aberration curves at the intermediate focal length, and FIGS. 3C, 4C, 5C, 6C, 7C and 8C respectively show the aberration curves on the long focal length side.

We claim:

1. A zoom lens system comprising a first, second, third and fourth lens groups in the order from the object side, said first lens group being a focusing lens group and having positive refractive power, said second lens group being a variator and having negative refractive power, said third lens group being a compensator and having positive refractive power, said first, second and third lens groups constituting a varifocal subsystem, said fourth lens group being a relay lens, said zoom lens system being arranged that said fourth lens group comprises a first lens component comprising a positive lens and a negative lens and having positive refractive power as a whole, a second lens component comprising a positive lens, a third lens component comprises a negative meniscus lens arranged to be convex toward the image side, and a fourth lens component comprising a positive lens, said zoom lens system fulfilling the following conditions (1) through (4)

$$0.3 < f_{4a}/f_4 < 3.0 \qquad (1)$$
$$0.03 < f_{4c}/f_{4bcd} < 0.3 \qquad (2)$$

$$1.0 < \left|\frac{r_{4c1} + r_{4c2}}{r_{4c1} - r_{4c2}}\right| < 3.0 \qquad (3)$$

$$0.01 < D/f_W < 0.3 \qquad (4)$$

where reference symbol $f_4$ represents the focal length of the fourth lens group, reference symbols $f_{4a}$ and $f_{4c}$ respectively represent the focal lengths of the first and third lens components in the fourth lens group, reference symbol $f_{4bcd}$ represents the total focal length of the second, third and fourth lens components in the fourth lens group, reference symbols $r_{4c1}$ and $r_{4c2}$ respectively represent radii of curvature of the surface on the object side and surface on the image side of the third lens component in the fourth lens group, reference symbol D represents the airspace between the third and fourth lens components in the fourth lens group, and reference symbol $f_W$ represents the focal length of the zoom lens system as a whole on the short focal length side.

2. A zoom lens system according to claim 1 wherein said first lens group comprises a positive cemented doublet and a positive lens, said second lens group comprises a negative lens and a negative cemented doublet, and said third lens group comprises a positive cemented doublet.

3. A zoom lens system according to claim 2 which has the following numerical data:

| | | | |
|---|---|---|---|
| $r_1 = $ | 144.9108 | | |
| | $d_1 = 2.8000$ | $n_1 = 1.80518$ | $\nu_1 = 25.43$ |
| $r_2 = $ | 68.2361 | | |
| | $d_2 = 6.6000$ | $n_2 = 1.61272$ | $\nu_2 = 58.75$ |
| $r_3 = $ | −5481.9920 | | |
| | $d_3 = 0.2000$ | | |
| $r_4 = $ | 89.3518 | | |
| | $d_4 = 4.7000$ | $n_3 = 1.61272$ | $\nu_3 = 58.75$ |
| $r_5 = $ | 11352.4996 | | |
| | $d_5 = D_1$ (variable) | | |
| $r_6 = $ | 648.1213 | | |
| | $d_6 = 1.5000$ | $n_4 = 1.713000$ | $\nu_4 = 53.84$ |
| $r_7 = $ | 40.1579 | | |
| | $d_7 = 4.2000$ | | |
| $r_8 = $ | −45.2768 | | |
| | $d_8 = 1.5000$ | $n_5 = 1.71300$ | $\nu_5 = 53.84$ |
| $r_9 = $ | 45.7879 | | |
| | $d_9 = 3.4000$ | $n_6 = 1.84666$ | $\nu_6 = 23.88$ |
| $r_{10} = $ | −6737.4941 | | |
| | $d_{10} = D_2$ (variable) | | |
| $r_{11} = $ | 112.8992 | | |

-continued

| | | | |
|---|---|---|---|
| | $d_{11} = 5.8000$ | $n_7 = 1.51633$ | $\nu_7 = 64.15$ |
| $r_{12} = -32.3291$ | | | |
| | $d_{12} = 1.5000$ | $n_8 = 1.75520$ | $\nu_8 = 27.51$ |
| $r_{13} = -57.1632$ | | | |
| | $d_{13} = D_3$ (variable) | | |
| $r_{14} = \infty$ (stop) | | | |
| | $d_{14} = 1.0000$ | | |
| $r_{15} = 24.5802$ | | | |
| | $d_{15} = 5.6126$ | $n_9 = 1.50048$ | $\nu_9 = 68.70$ |
| $r_{16} = 185.4000$ | | | |
| | $d_{16} = 2.2118$ | | |
| $r_{17} = -118.4028$ | | | |
| | $d_{17} = 2.0078$ | $n_{10} = 1.80610$ | $\nu_{10} = 35.22$ |
| $r_{18} = -1060.6686$ | | | |
| | $d_{18} = 19.216$ | | |
| $r_{19} = 148.6683$ | | | |
| | $d_{19} = 3.6148$ | $n_{11} = 1.51742$ | $\nu_{11} = 52.41$ |
| $r_{20} = -38.3100$ | | | |
| | $d_{20} = 5.2560$ | | |
| $r_{21} = -18.8457$ | | | |
| | $d_{21} = 3.0815$ | $n_{12} = 1.77250$ | $\nu_{12} = 49.66$ |
| $r_{22} = -146.5229$ | | | |
| | $d_{22} = 13.4117$ | | |
| $r_{23} = 90.1033$ | | | |
| | $d_{23} = 4.1132$ | $n_{13} = 1.51112$ | $\nu_{13} = 60.48$ |
| $r_{24} = -194.4020$ | | | |

$f = 70.019 \sim 136.124 \sim 203.770$
$f_{4a} = 79.944, \; f_4 = 112.031$
$f_{4a}/f_4 = 0.7136, \; f_{4c} = -28.294$
$f_{4bcd} = -176.874, \; f_{4c}/f_{4bcd} = 0.160$ $\left| \dfrac{r_{4c1} + r_{4c2}}{r_{4c1} - r_{4c2}} \right| = 1.2952, \; D/f_W = 0.192$

| f | 70.019 | 136.124 | 203.770 |
|---|---|---|---|
| $D_1$ | 3.253 | 32.663 | 43.108 |
| $D_2$ | 34.766 | 17.756 | 0.186 |
| $D_3$ | 16.055 | 3.655 | 10.780 | where, reference symbols $r_1$ through $r_{24}$ respectively represent radii of curvature of respective lens surfaces, reference symbols $d_1$ through $d_{23}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, and reference symbol f represents the focal length of the lens system as a whole.

4. A zoom lens system according to claim 2 which has the following numerical data:

| | | | |
|---|---|---|---|
| $r_1 = 142.9968$ | | | |
| | $d_1 = 2.8000$ | $n_1 = 1.80518$ | $\nu_1 = 25.43$ |
| $r_2 = 67.9794$ | | | |
| | $d_2 = 6.6000$ | $n_2 = 1.61272$ | $\nu_2 = 58.75$ |
| $r_3 = -6530.3523$ | | | |
| | $d_3 = 0.2000$ | | |
| $r_4 = 94.0605$ | | | |
| | $d_4 = 4.7000$ | $n_3 = 1.61272$ | $\nu_3 = 58.75$ |
| $r_5 = 12155.0599$ | | | |
| | $d_5 = D_1$ (variable) | | |
| $r_6 = 454.0262$ | | | |
| | $d_6 = 1.5000$ | $n_4 = 1.71300$ | $\nu_4 = 53.84$ |
| $r_7 = 40.3500$ | | | |
| | $d_7 = 4.2000$ | | |
| $r_8 = -45.1046$ | | | |
| | $d_8 = 1.5000$ | $n_5 = 1.71300$ | $\nu_5 = 53.84$ |
| $r_9 = 46.0978$ | | | |
| | $d_9 = 3.4000$ | $n_6 = 1.84666$ | $\nu_6 = 23.88$ |
| $r_{10} = -2104.2705$ | | | |
| | $d_{10} = D_2$ (variable) | | |

-continued

| | | | |
|---|---|---|---|
| $r_{11} = 111.8042$ | | | |
| | $d_{11} = 5.8000$ | $n_7 = 1.51633$ | $\nu_7 = 64.15$ |
| $r_{12} = -32.3806$ | | | |
| | $d_{12} = 1.5000$ | $n_8 = 1.75520$ | $\nu_8 = 27.51$ |
| $r_{13} = -56.6383$ | | | |
| | $d_{13} = D_3$ (variable) | | |
| $r_{14} = \infty$ (stop) | | | |
| | $d_{14} = 1.0000$ | | |
| $r_{15} = 29.2023$ | | | |
| | $d_{15} = 5.5711$ | $n_9 = 1.50048$ | $\nu_9 = 68.86$ |
| $r_{16} = -12111.2296$ | | | |
| | $d_{16} = 2.1862$ | | |
| $r_{17} = -102.6169$ | | | |
| | $d_{17} = 1.9800$ | $n_{10} = 1.80610$ | $\nu_{10} = 38.27$ |
| $r_{18} = 771.0715$ | | | |
| | $d_{18} = 19.2054$ | | |
| $r_{19} = 138.6019$ | | | |
| | $d_{19} = 3.5882$ | $n_{11} = 1.51742$ | $\nu_{11} = 52.41$ |
| $r_{20} = -64.0731$ | | | |
| | $d_{20} = 14.8972$ | | |
| $r_{21} = -20.3040$ | | | |
| | $d_{21} = 1.6732$ | $n_{12} = 1.77250$ | $\nu_{12} = 49.66$ |
| $r_{22} = -91.1372$ | | | |
| | $d_{22} = 5.2036$ | | |
| $r_{23} = 120.8274$ | | | |
| | $d_{23} = 4.0093$ | $n_{13} = 1.51112$ | $\nu_{13} = 60.48$ |
| $r_{24} = -90.7416$ | | | |

$f = 70.019 \sim 136.124 \sim 203.77$
$f_{4a} = 108.832, \; f_4 = 115.886$
$f_{4a}/f_4 = 0.9391, \; f_{4c} = -34.169$
$f_{4bcd} = -306.646, \; f_{4c}/f_{4bcd} = 0.1114$ $\left| \dfrac{r_{4c1} + r_{4c2}}{r_{4c1} - r_{4c2}} \right| = 1.5733, \; D/f_W = 0.074$

| f | 70.019 | 136.124 | 203.77 |
|---|---|---|---|
| $D_1$ | 1.141 | 32.722 | 43.856 |
| $D_2$ | 34.231 | 17.360 | 0.058 |
| $D_3$ | 18.913 | 4.203 | 10.371 | where, reference symbols $r_1$ through $r_{24}$ respectively represent radii of curvature of respective lens surfaces, reference symbols $d_1$ through $d_{23}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, and reference symbol f represents the focal length of the lens system as a whole.

5. A zoom lens system according to claim 1 wherein said first lens group comprises a positive cemented doublet and a positive lens, said second lens group comprises a negative cemented doublet, a negative lens and a positive lens, and said third lens group comprises a positive cemented doublet.

6. A zoom lens system according to claim 5 which has the following numerical data:

| | | | |
|---|---|---|---|
| $r_1 = 127.9700$ | | | |
| | $d_1 = 2.6000$ | $n_1 = 1.78472$ | $\nu_1 = 25.68$ |
| $r_2 = 58.4160$ | | | |
| | $d_2 = 6.8000$ | $n_2 = 1.62280$ | $\nu_2 = 57.06$ |
| $r_3 = \infty$ | | | |
| | $d_3 = 0.1500$ | | |
| $r_4 = 86.2160$ | | | |
| | $d_4 = 4.6000$ | $n_3 = 1.62299$ | $\nu_3 = 58.14$ |
| $r_5 = \infty$ | | | |
| | $d_5 = D_1$ (variable) | | |
| $r_6 = -212.4540$ | | | |
| | $d_6 = 1.7000$ | $n_4 = 1.74320$ | $\nu_4 = 49.31$ |
| $r_7 = 24.1010$ | | | |
| | $d_7 = 3.4000$ | $n_5 = 1.78472$ | $\nu_5 = 25.68$ |

-continued

| | | | |
|---|---|---|---|
| $r_8 =$ 35.6490 | | | |
| | $d_8 =$ 4.0000 | | |
| $r_9 =$ −53.1720 | | | |
| | $d_9 =$ 1.6000 | $n_6 =$ 1.77250 | $\nu_6 =$ 49.66 |
| $r_{10} =$ 95.6530 | | | |
| | $d_{10} =$ 0.6400 | | |
| $r_{11} =$ 68.3100 | | | |
| | $d_{11} =$ 3.2000 | $n_7 =$ 1.78472 | $\nu_7 =$ 25.68 |
| $r_{12} =$ −233.9170 | | | |
| | $d_{12} = D_2$ (variable) | | |
| $r_{13} =$ 117.3390 | | | |
| | $d_{13} =$ 5.8000 | $n_8 =$ 1.51112 | $\nu_8 =$ 60.48 |
| $r_{14} =$ −30.7220 | | | |
| | $d_{14} =$ 2.0000 | $n_9 =$ 1.78472 | $\nu_9 =$ 25.68 |
| $r_{15} =$ −52.8370 | | | |
| | $d_{15} = D_3$ (variable) | | |
| $r_{16} = \infty$ (stop) | | | |
| | $d_{16} =$ 1.7000 | | |
| $r_{17} =$ 26.1193 | | | |
| | $d_{17} =$ 5.6000 | $n_{10} =$ 1.51112 | $\nu_{10} =$ 60.48 |
| $r_{18} =$ 470.2221 | | | |
| | $d_{18} =$ 1.9600 | | |
| $r_{19} =$ −125.9016 | | | |
| | $d_{19} =$ 1.6000 | $n_{11} =$ 1.83400 | $\nu_{11} =$ 37.16 |
| $r_{20} =$ 154.9461 | | | |
| | $d_{20} =$ 19.9900 | | |
| $r_{21} =$ 63.8585 | | | |
| | $d_{21} =$ 3.5300 | $n_{12} =$ 1.51742 | $\nu_{12} =$ 52.41 |
| $r_{22} =$ −54.7038 | | | |
| | $d_{22} =$ 10.9200 | | |
| $r_{23} =$ −20.1245 | | | |
| | $d_{23} =$ 2.0600 | $n_{13} =$ 1.77250 | $\nu_{13} =$ 49.66 |
| $r_{24} =$ −81.2528 | | | |
| | $d_{24} =$ 9.3286 | | |
| $r_{25} =$ 61.1383 | | | |
| | $d_{25} =$ 4.0000 | $n_{14} =$ 1.51112 | $\nu_{14} =$ 60.48 |
| $r_{26} =$ 118.9530 | | | |

$f = 66.922 \sim 113.933 \sim 194.051$
$f_{4a} = 126.251$, $f_4 = 117.668$
$f_{4a}/f_4 = 1.0729$, $f_{4c} = -35.144$
$f_{4bcd} = -547.444$, $f_{4c}/f_{4bcd} = 0.0642$ $\left|\dfrac{r_{41} + r_{42}}{r_{41} - r_{42}}\right| = 1.6584$, $D/f_W = 0.139$

| f | 66.922 | 113.933 | 194.051 |
|---|---|---|---|
| $D_1$ | 2.191 | 24.467 | 37.535 |
| $D_2$ | 36.355 | 23.260 | 0.975 |
| $D_3$ | 10.982 | 1.800 | 11.017 | where, reference symbols $r_1$ through $r_{26}$ respectively represent radii of curvature of respective lens surfaces, reference symbols $d_1$ through $d_{25}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

7. A zoom lens system according to claim 5 which has the following numerical data:

| | | | |
|---|---|---|---|
| $r_1 =$ 125.0059 | | | |
| | $d_1 =$ 2.6000 | $n_1 =$ 1.78472 | $\nu_1 =$ 25.68 |
| $r_2 =$ 58.4160 | | | |
| | $d_2 =$ 6.8000 | $n_2 =$ 1.62299 | $\nu_2 =$ 58.14 |
| $r_3 = \infty$ | | | |
| | $d_3 =$ 0.1500 | | |
| $r_4 =$ 88.0510 | | | |
| | $d_4 =$ 4.6000 | $n_3 =$ 1.62299 | $\nu_3 =$ 58.14 |
| $r_5 = \infty$ | | | |
| | $d_5 = D_1$ (variable) | | |
| $r_6 =$ −212.4540 | | | |

-continued

| | | | |
|---|---|---|---|
| | $d_6 =$ 1.7000 | $n_4 =$ 1.74320 | $\nu_4 =$ 49.31 |
| $r_7 =$ 24.1010 | | | |
| | $d_7 =$ 3.4000 | $n_5 =$ 1.78472 | $\nu_5 =$ 25.68 |
| $r_8 =$ 35.6490 | | | |
| | $d_8 =$ 4.0000 | | |
| $r_9 =$ −53.1720 | | | |
| | $d_9 =$ 1.6000 | $n_6 =$ 1.77250 | $\nu_6 =$ 49.66 |
| $r_{10} =$ 95.6530 | | | |
| | $d_{10} =$ 0.6400 | | |
| $r_{11} =$ 68.3100 | | | |
| | $d_{11} =$ 3.2000 | $n_7 =$ 1.78472 | $\nu_7 =$ 25.68 |
| $r_{12} =$ −233.9318 | | | |
| | $d_{12} = D_2$ (variable) | | |
| $r_{13} =$ 117.3390 | | | |
| | $d_{13} =$ 5.8000 | $n_8 =$ 1.51112 | $\nu_8 =$ 60.48 |
| $r_{14} =$ −30.7220 | | | |
| | $d_{14} =$ 2.0000 | $n_9 =$ 1.78472 | $\nu_9 =$ 25.68 |
| $r_{15} =$ −52.8370 | | | |
| | $d_{15} = D_3$ (variable) | | |
| $r_{16} = \infty$ (stop) | | | |
| | $d_{16} =$ 1.7000 | | |
| $r_{17} =$ 26.4827 | | | |
| | $d_{17} =$ 5.6000 | $n_{10} =$ 1.50048 | $\nu_{10} =$ 65.99 |
| $r_{18} = \infty$ | | | |
| | $d_{18} =$ 2.2000 | | |
| $r_{19} =$ −128.0029 | | | |
| | $d_{19} =$ 2.0000 | $n_{11} =$ 1.80610 | $\nu_{11} =$ 40.95 |
| $r_{20} =$ 199.5243 | | | |
| | $d_{20} =$ 19.9834 | | |
| $r_{21} =$ 100.7291 | | | |
| | $d_{21} =$ 3.6000 | $n_{12} =$ 1.51742 | $\nu_{12} =$ 52.41 |
| $r_{22} =$ −63.4132 | | | |
| | $d_{22} =$ −10.9209 | | |
| $r_{23} =$ −19.6359 | | | |
| | $d_{23} =$ 1.8000 | $n_{13} =$ 1.77250 | $\nu_{13} =$ 49.66 |
| $r_{24} =$ −81.8964 | | | |
| | $d_{24} =$ 8.5646 | | |
| $r_{25} =$ 113.1923 | | | |
| | $d_{25} =$ 4.0000 | $n_{14} =$ 1.51112 | $\nu_{14} =$ 60.48 |
| $r_{26} =$ −132.6134 | | | |

$f = 66.923 \sim 113.941 \sim 194.149$
$f_{4a} = 102.258$, $f_4 = 117.565$
$f_{4a}/f_4 = 0.8698$, $f_{4c} = -33.862$
$f_{4bcd} = -271.117$, $f_{4c}/f_{4bcd} = 0.1249$ $\left|\dfrac{r_{41} + r_{42}}{r_{41} - r_{42}}\right| = 1.6308$, $D/f_W = 0.128$

| f | 66.923 | 113.941 | 194.149 |
|---|---|---|---|
| $D_1$ | 2.128 | 24.404 | 37.471 |
| $D_2$ | 36.355 | 23.260 | 0.976 |
| $D_3$ | 10.982 | 1.800 | 11.017 | where, reference symbols $r_1$ through $r_{26}$ respectively represent radii of curvature of respective lens surfaces, reference symbols $d_1$ through $d_{15}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

8. A zoom lens system according to claim 5 which has the following numerical data:

| | | | |
|---|---|---|---|
| $r_1 =$ 127.97000 | | | |
| | $d_1 =$ 2.6000 | $n_1 =$ 1.78472 | $\nu_1 =$ 25.68 |
| $r_2 =$ 58.4160 | | | |
| | $d_2 =$ 6.8000 | $n_2 =$ 1.62280 | $\nu_2 =$ 57.06 |
| $r_3 = \infty$ | | | |
| | $d_3 =$ 0.1500 | | |
| $r_4 =$ 86.2160 | | | |
| | $d_4 =$ 4.6000 | $n_3 =$ 1.62299 | $\nu_3 =$ 58.14 |
| $r_5 = \infty$ | | | |

-continued

|  |  |  |  |
|---|---|---|---|
| | $d_5 = D_1$ (variable) | | |
| $r_6 = -212.4540$ | | | |
| | $d_6 = 1.7000$ | $n_4 = 1.74320$ | $\nu_4 = 49.31$ |
| $r_7 = 24.1010$ | | | |
| | $d_7 = 3.4000$ | $n_5 = 1.78472$ | $\nu_5 = 25.68$ |
| $r_8 = 35.6490$ | | | |
| | $d_8 = 4.0000$ | | |
| $r_9 = -53.1720$ | | | |
| | $d_9 = 1.6000$ | $n_6 = 1.77250$ | $\nu_6 = 49.66$ |
| $r_{10} = 95.6530$ | | | |
| | $d_{10} = 0.6400$ | | |
| $r_{11} = 68.3100$ | | | |
| | $d_{11} = 3.2000$ | $n_7 = 1.78472$ | $\nu_7 = 25.68$ |
| $r_{12} = -233.9170$ | | | |
| | $d_{12} = D_2$ (variable) | | |
| $r_{13} = 117.3390$ | | | |
| | $d_{13} = 5.8000$ | $n_8 = 1.51112$ | $\nu_8 = 60.48$ |
| $r_{14} = -30.7220$ | | | |
| | $d_{14} = 2.0000$ | $n_9 = 1.78472$ | $\nu_9 = 25.68$ |
| $r_{15} = -52.8370$ | | | |
| | $d_{15} = D_3$ (variable) | | |
| $r_{16} = \infty$ (stop) | | | |
| | $d_{16} = 1.8494$ | | |
| $r_{17} = 26.7721$ | | | |
| | $d_{17} = 5.6000$ | $n_{10} = 1.50048$ | $\nu_{10} = 65.99$ |
| $r_{18} = 5065.7532$ | | | |
| | $d_{18} = 2.2000$ | | |
| $r_{19} = -117.1642$ | | | |
| | $d_{19} = 2.0000$ | $n_{11} = 1.80610$ | $\nu_{11} = 40.95$ |
| $r_{20} = 190.9331$ | | | |
| | $d_{20} = 19.9824$ | | |
| $r_{21} = 72.4887$ | | | |
| | $d_{21} = 3.6000$ | $n_{12} = 1.51742$ | $\nu_{12} = 52.41$ |
| $r_{22} = -57.4998$ | | | |
| | $d_{22} = 10.9196$ | | |
| $r_{23} = -20.2962$ | | | |
| | $d_{23} = 1.8000$ | $n_{13} = 1.77250$ | $\nu_{13} = 49.66$ |
| $r_{24} = -108.8218$ | | | |
| | $d_{24} = 8.4955$ | | |
| $r_{25} = 89.8728$ | | | |
| | $d_{25} = 4.0000$ | $n_{14} = 1.51112$ | $\nu_{14} = 60.48$ |
| $r_{26} = -447.2719$ | | | |

$f = 66.923 \sim 113.901 \sim 194.091$
$f_{4a} = 113.799, f_4 = 117.616$
$f_{4a}/f_4 = 0.9675, f_{4c} = -32.586$
$f_{4bcd} = -358.677, f_{4c}/f_{4bcd} = 0.0909$ $\left| \dfrac{r_{41} + r_{42}}{r_{41} - r_{42}} \right| = 1.4585, D/f_W = 0.127$

| f | 66.923 | 113.901 | 194.091 |
|---|---|---|---|
| $D_1$ | 2.208 | 24.448 | 37.516 |
| $D_2$ | 36.355 | 23.260 | 0.975 |
| $D_3$ | 10.982 | 1.800 | 11.017 | where, reference symbols $r_1$ through $r_{26}$ respectively represent radii of curvature of respective lens surface, reference symbols $d_1$ through $d_{25}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

9. A zoom lens system according to claim 5 which has the following numerical data:

$r_1 = 127.9700$

-continued

|  |  |  |  |
|---|---|---|---|
| | $d_1 = 2.6000$ | $n_1 = 1.78472$ | $\nu_1 = 25.68$ |
| $r_2 = 58.4160$ | | | |
| | $d_2 = 6.8000$ | $n_2 = 1.62280$ | $\nu_2 = 57.06$ |
| $r_3 = \infty$ | | | |
| | $d_3 = 0.1500$ | | |
| $r_4 = 86.2160$ | | | |
| | $d_4 = 4.6000$ | $n_3 = 1.622299$ | $\nu_3 = 58.14$ |
| $r_5 = \infty$ | | | |
| | $d_5 = D_1$ (variable) | | |
| $r_6 = -212.4540$ | | | |
| | $d_6 = 1.7000$ | $n_4 = 1.74320$ | $\nu_4 = 49.31$ |
| $r_7 = 24.1010$ | | | |
| | $d_7 = 3.4000$ | $n_5 = 1.78472$ | $\nu_5 = 25.68$ |
| $r_8 = 35.6490$ | | | |
| | $d_8 = 4.0000$ | | |
| $r_9 = -53.1720$ | | | |
| | $d_9 = 1.6000$ | $n_6 = 1.77250$ | $\nu_6 = 49.66$ |
| $r_{10} = 95.6530$ | | | |
| | $d_{10} = 0.6400$ | | |
| $r_{11} = 68.3100$ | | | |
| | $d_{11} = 3.2000$ | $n_7 = 1.78472$ | $\nu_7 = 25.68$ |
| $r_{12} = -233.9170$ | | | |
| | $d_{12} = D_2$ (variable) | | |
| $r_{13} = 117.3390$ | | | |
| | $d_{13} = 5.8000$ | $n_8 = 1.51112$ | $\nu_8 = 60.48$ |
| $r_{14} = -30.7220$ | | | |
| | $d_{14} = 2.000$ | $n_9 = 1.78472$ | $\nu_9 = 25.68$ |
| $r_{15} = -52.8370$ | | | |
| | $d_{15} = D_3$ (variable) | | |
| $r_{16} = \infty$ (stop) | | | |
| | $d_{16} = 1.7000$ | | |
| $r_{17} = 26.7709$ | | | |
| | $d_{17} = 5.6000$ | $n_{10} = 1.51112$ | $\nu_{10} = 60.48$ |
| $r_{18} = \infty$ | | | |
| | $d_{18} = 2.2000$ | | |
| $r_{19} = -118.1771$ | | | |
| | $d_{19} = 2.0000$ | $n_{11} = 1.83400$ | $\nu_{11} = 37.16$ |
| $r_{20} = 178.9330$ | | | |
| | $d_{20} = 19.9892$ | | |
| $r_{21} = 71.6571$ | | | |
| | $d_{21} = 3.6000$ | $n_{12} = 1.51742$ | $\nu_{12} = 52.41$ |
| $r_{22} = -56.5196$ | | | |
| | $d_{22} = 10.9200$ | | |
| $r_{23} = -20.1562$ | | | |
| | $d_{23} = 1.8000$ | $n_{13} = 1.77250$ | $\nu_{13} = 49.66$ |
| $r_{24} = -129.7039$ | | | |
| | $d_{24} = 8.4593$ | | |
| $r_{25} = 84.9757$ | | | |
| | $d_{25} = 4.0000$ | $n_{14} = 1.51112$ | $\nu_{14} = 60.48$ |
| $r_{26} = -266.5989$ | | | |

$f = 66.923 \sim 113.901 \sim 104.090$
$f_{4a} = 114.146, f_4 = 117.603$
$f_{4a}/f_4 = 0.9706, f_{4c} = -31.116$
$f_{4bcd} = -386.461, f_{4c}/f_{4bcd} = 0.0805$ $\left| \dfrac{r_{41} + r_{42}}{r_{41} - r_{42}} \right| = 1.368, D/f_W = 0.126$

| f | 66.923 | 113.901 | 194.090 |
|---|---|---|---|
| $D_1$ | 2.208 | 24.448 | 37.516 |
| $D_2$ | 36.355 | 23.260 | 0.975 |
| $D_3$ | 10.982 | 1.800 | 11.017 | where, reference symbols $r_1$ through $r_{26}$ respectively represent radii of curvature of respective lens surfaces, reference symbols $d_1$ through $d_{25}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

* * * * *